United States Patent [19]

Maegawa et al.

[11] Patent Number: 5,745,463
[45] Date of Patent: Apr. 28, 1998

[54] PHASE-CHANGE OPTICAL DISC RECORDING METHOD AND APPARATUS, AND INFORMATION RECORDING APPARATUS AND RECORDING PRE-COMPENSATION METHOD

[75] Inventors: Hiroshi Maegawa; Ikuo Aoki, both of Yokohama, Japan

[73] Assignee: Ricoh Company, Ltd., Tokyo, Japan

[21] Appl. No.: 812,970

[22] Filed: Mar. 5, 1997

Related U.S. Application Data

[62] Division of Ser. No. 536,833, Sep. 26, 1995, Pat. No. 5,648,952.

[30] Foreign Application Priority Data

Sep. 28, 1994 [JP] Japan ..................... 6-232830
Oct. 27, 1994 [JP] Japan ..................... 6-263339

[51] Int. Cl.⁶ .................................. G11B 7/00
[52] U.S. Cl. ................... 369/59; 369/116; 369/54; 369/47
[58] Field of Search ............... 369/59, 42, 48, 369/49, 50, 54, 58, 116, 13

[56] References Cited

U.S. PATENT DOCUMENTS

| | | |
|---|---|---|
| 5,036,519 | 7/1991 | Ema et al. |
| 5,043,971 | 8/1991 | Van et al. |
| 5,128,921 | 7/1992 | Van et al. |
| 5,353,277 | 10/1994 | Yasuda et al. |
| 5,452,272 | 9/1995 | Murakami et al. |
| 5,452,284 | 9/1995 | Miyagawa et al. |
| 5,508,995 | 4/1996 | Moriya et al. |
| 5,513,165 | 4/1996 | Ide et al. ............... 369/116 |
| 5,602,823 | 2/1997 | Aoki et al. |

FOREIGN PATENT DOCUMENTS

| | | |
|---|---|---|
| 59-146457 | 8/1984 | Japan |
| 59-193544 | 11/1984 | Japan |
| 63-266632 | 11/1988 | Japan |
| 63-300436 | 12/1988 | Japan |

OTHER PUBLICATIONS

Kayanuma, et al., "High Track Density Magneto–Optical Recording Using a Crosstalk Canceler", Proceeding of Optical Data Storage '90, pp. 18–21, 1990.

Primary Examiner—Muhammad N. Edun
Attorney, Agent, or Firm—Cooper & Dunham LLP

[57] ABSTRACT

A trial writing operation is performed on a phase-change optical disc using write and erase light-emitting powers, which together are varied according to predetermined variation ratios respectively. Signals relevant to said trial writing operation are reproduced from said disc. Optimum ones of the write and erase light-emitting powers are determined using the thus-reproduced signals. The predetermined variation ratios for the write and erase light-emitting powers may be the same as each other. Alternatively, the trial writing operation may be performed on a phase-change optical disc using write and erase light-emitting powers which are individually varied according to predetermined variation ratios respectively.

6 Claims, 24 Drawing Sheets

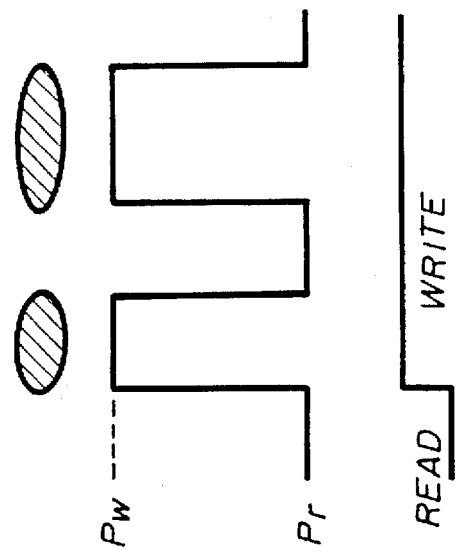
FIG. IB
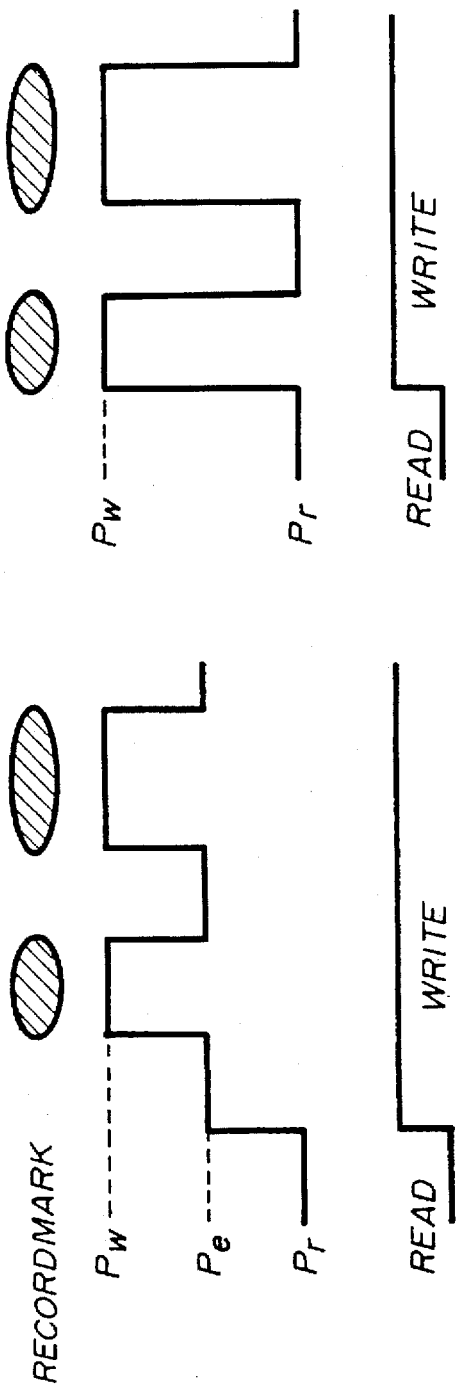
FIG. IA

FIG. 4

| ZONE OR BAND | NOMINAL RADIUS START-END (mm) | NUMBER OF TRACKS | TRACK NUMBER START-END | NUMBER OF REVOLUTIONS |
|---|---|---|---|---|
| LABEL | - 22.60 | N/A | N/A | N/A |
| LEAD-IN ZONE | 22.60 - 22.90 | N/A | N/A | N/A |
| INITIAL ZONE | | | | |
| ACQUIRE ZONE | 22.90 - 23.53 | 450 | -790 - -341 | 450 |
| LEAD-IN TRACKS | | | | |
| FOCUS TRACKS | 23.53 - 23.76 | 4 | -340 - -337 | 4 |
| INNER TEST ZONE | | | | |
| FOR MANUF'ER | 23.53 - 23.76 | 160 | -336 - -177 | 160 |
| FOR DRIVES | 23.76 - 23.96 | 160 | -176 - -17 | 160 |
| INNER CONTROL ZONE | 23.98 - 24.00 | 16 | -16 - -1 | 16 |
| DATA ZONE | | | | |
| BAND 0 | 24.00 - 25.60 | 1380 | 0 - 1379 | 1150 |
| BAND 1 | 25.60 - 27.20 | 1472 | 1380 - 2851 | 1150 |
| BAND 2 | 27.20 - 28.80 | 1564 | 2852 - 4415 | 1150 |
| BAND 3 | 28.80 - 30.40 | 1656 | 4416 - 6071 | 1150 |
| BAND 4 | 30.40 - 32.00 | 1745 | 6072 - 7819 | 1150 |
| BAND 5 | 32.00 - 33.60 | 1840 | 7820 - 9659 | 1150 |
| BAND 6 | 33.60 - 35.20 | 1932 | 9660 - 11591 | 1150 |
| BAND 7 | 35.20 - 36.80 | 2024 | 11592 - 13615 | 1150 |
| BAND 8 | 36.80 - 38.40 | 2116 | 13616 - 15731 | 1150 |
| BAND 9 | 38.40 - 40.00 | 2208 | 15732 - 17939 | 1150 |
| LEAD-OUT ZONE | | | | |
| OUTER CONTROL ZONE | 40.00 - 40.02 | 16 | 17940 - 17955 | 16 |
| OUTER TEST ZONE | | | | |
| FOR DRIVES | 40.02 - 40.24 | 160 | 17956 - 18115 | 160 |
| FOR MENUF'ER | 40.24 - 40.46 | 160 | 18116 - 18275 | 160 |
| BUFFER ZONE | 40.46 - 41.00 | 383 | 18276 - 18658 | 383 |

FIG. 5

| I | N | $P_w$ | $P_e$ |
|---|---|---|---|
| 1 | $-n$ | $P_{w\,ref}(1-na)$ | $P_{e\,ref}(1-nb)$ |
| --- | $-2$ | | |
| | $-1$ | | |
| $n+1$ | $0$ | $P_{w\,ref}$ | $P_{e\,ref}$ |
| | $1$ | | |
| --- | $2$ | | |
| $2n+1$ | $n$ | $P_{w\,ref}(1+na)$ | $P_{e\,ref}(1+nb)$ |

$P_w = P_{w\,ref}(1+Na)$
$P_e = P_{e\,ref}(1+Nb)$
$-n \leq N \leq n$ n : INTEGER
$0 < a < 1$
$0 < b < 1$

FIG. 8

| N | J | Pw | K | Pe |
|---|---|---|---|---|
| -n | 1 | $P_{w\,ref}(1-na)$ | 1 | $P_{e\,ref}(1-nb)$ |
| ... | ... | ... | ... | ... |
| -1 | n | $P_{w\,ref}$ | n+1 | $P_{e\,ref}$ |
| 0 | n+1 | $P_{w\,ref}$ | | |
| 1 | n+2 | $P_{w\,ref}$ | n+1 | $P_{e\,ref}$ |
| ... | ... | ... | ... | ... |
| n | 2n+1 | $P_{w\,ref}(1+na)$ | 2n+1 | $P_{e\,ref}(1+nb)$ |

$P_w = P_{w\,ref}(1+Na)$ $P_e = P_{e\,ref}(1+Nb)$ $-n \leqq N \leqq n$ n : INTEGER
$0 < a < 1$
$0 < b < 1$ FIG.15A RECORDING WAVEFORM
FIG.15B SAMPLE TIMING
FIG.15C LIGHT DETECTOR OUTPUT WAVEFORM
FIG.15D AVERAGING CIRCUIT OUTPUT WAVEFORM (VOLTAGE)

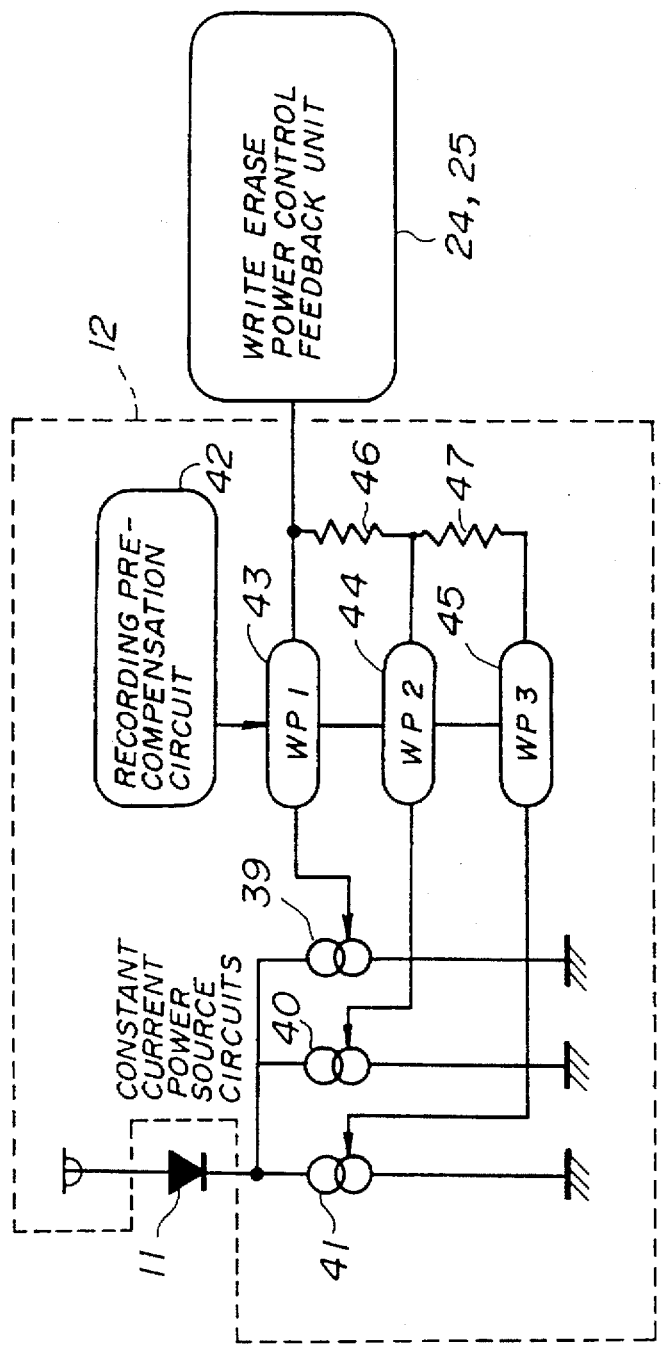

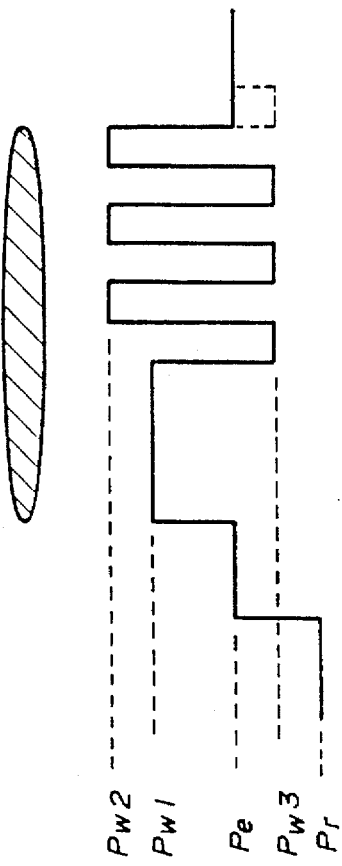
FIG. 22A REFERENCE CLOCK PULSES
FIG. 22B RECORD MARK
FIG. 22C RECORDING WAVEFORM

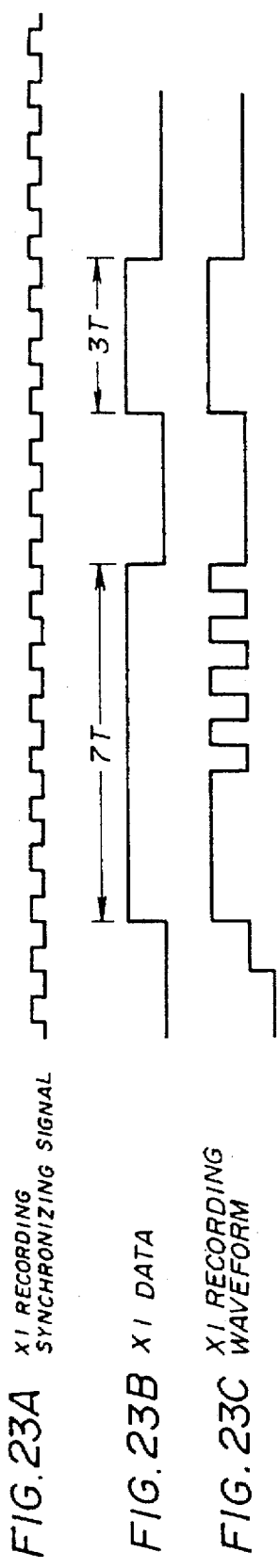
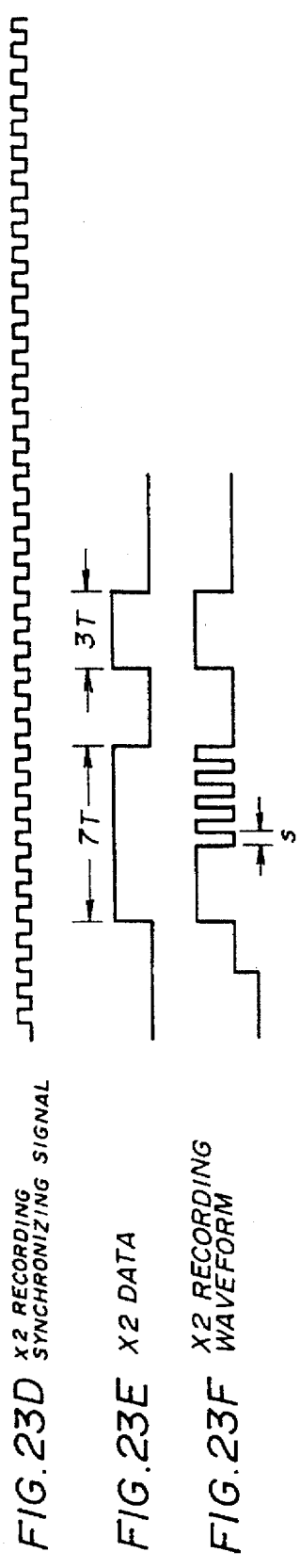
FIG. 23A X1 RECORDING SYNCHRONIZING SIGNAL
FIG. 23B X1 DATA
FIG. 23C X1 RECORDING WAVEFORM
FIG. 23D X2 RECORDING SYNCHRONIZING SIGNAL
FIG. 23E X2 DATA
FIG. 23F X2 RECORDING WAVEFORM

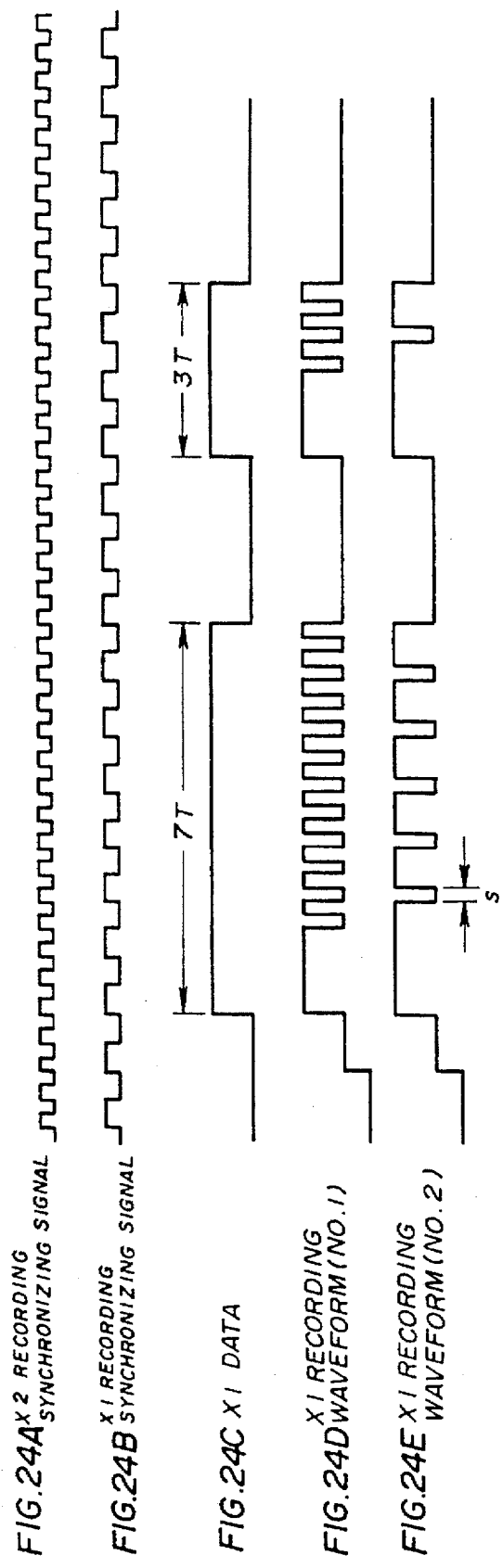

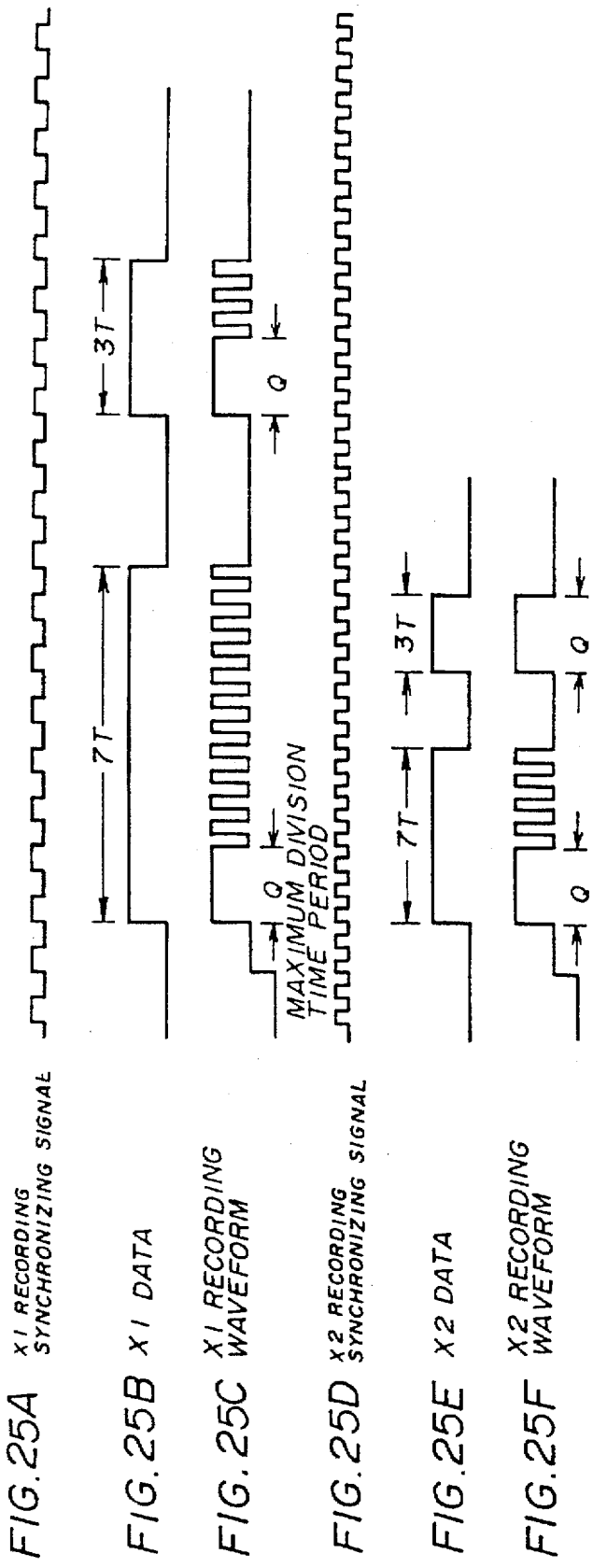

PHASE-CHANGE OPTICAL DISC RECORDING METHOD AND APPARATUS, AND INFORMATION RECORDING APPARATUS AND RECORDING PRE-COMPENSATION METHOD

This is a continuation of application Ser. No. 08/536,833 filed Sep. 26, 1995 now U.S. Pat. No. 5,648,952.

BACKGROUND OF THE INVENTION

1. Field of the Invention

The present invention relates to a phase-change optical disc recording method, in particular, to a method for determining an optimum recording LD (Laser Diode) power to be used in a phase-change optical disc recording. The phase-change optical disc recording is, for example, recording information on a phase-change optical disc from which a conventional CD (compact disc) player and a conventional CD-ROM drive apparatus can read data.

Further, the present invention relates to an information recording and reproducing apparatus and method for optically recording information in and reproducing information from a recording medium. In particular, the present invention relates to an optical disc (such as a phase-change optical disc) recording apparatus which controls the recording device (such as an LD) power to be an optimum one. The phase-change optical disc recording apparatus is, for example, a phase-change optical disc recording apparatus which can also read data from a CD and a CD-ROM.

Further, the present invention relates to a recording pre-compensation method for achieving a desired-shaped mark formed in a recording medium.

2. Description of the Related Art

Optical discs can be classified into WORM (Write Once, Read Many) ones and rewriteable ones. The rewriteable discs can further be classified into magneto-optical discs and phase-change discs. For the phase-change discs, a phase-change recording technique is used. In the technique, data is recorded by using two transition phases of a recording layer metal of such a disc, which phases are an amorphous phase and a crystal phase. The reflectivity is different between the two transition phases and this property of the recording layer metal is used for the data recording.

Japanese Laid-Open Patent Application No.63-25408 discloses an optical disc recording method in the related art. In this system, an optimum value of a recording light intensity is determined. Further, in order to keep a good recording quality, a recording light intensity is varied for recording initially. Then, a thus-recorded signal is reproduced and a recording light intensity which results in a good state of the reproduced signal is determined as being the above-mentioned optimum recording light intensity. Then, the recording light intensity is controlled to be the optimum one and actual signal recording is performed. In other words, before starting actual signal recording, a trial is performed so as to determine the optimum recording power.

With regard to optical disc recording, a sensitivity of a recording medium and/or a light emitting power of a recording LD (Laser Diode) may be degraded due to time elapsing and dust/dirt adhering thereto. The degradation should be compensated for so as to perform data recording in an optimum condition. One method of compensating for this degradation is to perform the above-described trial so as to determine the optimum recording power. In a standardized optical disc, a trial writing region is provided in a medium format. This region is used for trial writing using a varying recording LD power before recording actual data. Then, a signal thus recorded in the region is reproduced and an optimum recording condition is determined using the reproduced signal. Then, the actual data recording is performed using the thus-obtained optimum recording condition.

With regard to phase-change optimum disc recording, such trial writing is needed. However, a plurality of recording LD power values for determining recording conditions are used for this recording. Therefore, it is not possible to use an optimum LD power detecting algorithm which has been conventionally used. Thus, a trial writing method for the phase-change optimum disc has not been established.

A density of an optical disc as a recording medium has been advantageously increased and also a speed of recording data in an optical disc has been advantageously increased. Further, in response to this, various recording methods suitable for the increased-density optical disc and increased recording speed have been proposed and embodied. One of these recording methods is a multi-pulse recording method.

The multi-pulse recording method will now be described. Information is optically recorded in and reproduced from an optical disc by an output of a semiconductor light-emitting device. In this recording, record marks representing the information are recorded in the optical disc and thus the information is recorded in the optical disc. According to the multi-pulse recording method, when one record mark is formed on the optical disc, a recording waveform to be input to the semiconductor light-emitting device for this purpose includes a series of discrete pulses having different light-emitting powers.

Advantages obtained from the multi-pulse recording method will now be described. This method may be applied to a PWM (Pit Width Modulation) method. In this PWM method, a pit (serving as a record mark) is formed on an optical disc and a width of each one of thus-formed pits represents the information. In the PWM method, it is essential to define a length and a width of the mark (pit) precisely in forming the mark. If a waveform which is one not divided into a series of discrete pulses is input to the semiconductor light-emitting device, heat concentrically stored at a position in the optical disc due to the light emission thereto may result in a tear-drop-shaped pit at the position. As a result, it is difficult to control the length and width of the mark precisely. In contrast to this, in the multi-pulse recording method, by inputting the waveform divided into the series of discrete pulses to the semiconductor light-emitting device, it is possible to effectively disperse the heat stored at the position in the optical disc due to the light emission. Thus, it is possible to precisely control the length and width of the pit at the position. Such an operation for controlling a shape of a record mark may be referred to as 'recording pre-compensation', hereinafter.

In particular, when the multi-pulse recording method is applied to the phase-change optical disc recording, by appropriately changing an output intensity of the semiconductor light-emitting device with time, it is possible to sharply cool the recording layer of the optical disc. Thus, it is possible to form the mark in a desired shape.

Japanese Patent Publication No.4-67260 discloses a light-output automatic-control apparatus as a semiconductor light-emitting device output-control apparatus which uses a semiconductor light-emitting device (semiconductor laser) and controls an output of the semiconductor light-emitting device. In the disclosed light-output automatic-control apparatus, a light detector is provided for receiving part of a light output from the semiconductor light-emitting device. Then, an output signal from the light detector is used as a feedback signal for the semiconductor light-emitting device output control.

This light-output automatic-control apparatus is not a semiconductor light-emitting device output-control apparatus in the multi-pulse recording method. However, in broad perspective, it is possible to apply the principle of the light-output automatic-control apparatus to a semiconductor light-emitting device output-control apparatus in the multi-pulse recording method. However, a semiconductor light-emitting device output-control apparatus in the prior art such as a typical light-output automatic-control apparatus can control and set only two light-emitting powers from the semiconductor light-emitting device, namely a read power and a write power. The read power is used when light is applied to an optical disc so as to reproduce information which was recorded therein. The read power may be referred to as a bias power. The write power is used to form a mark in the optical disc so as to record information therein.

In comparison to this, there are apparatuses in which it is necessary to control a semiconductor light-emitting device output using a number, more than two, of values of light-emitting power. Such an apparatus is, for example, a phase-change optical disc drive apparatus. For such an apparatus, it is not possible to use the principle of the above-described conventional semiconductor light-emitting device control apparatus which can control only two light-output powers.

Another possible problem in the conventional semiconductor light-emitting device control apparatus, such as the above-described light-output automatic-control apparatus using the light detector for obtaining the feedback signal for the relevant control operation, concerns a semiconductor light-emitting device output control speed depending on a performance of the light detector. If such an apparatus is used for controlling a light-emitting power to meet a recent demand for high-speed recording and the multi-pulse recording method, it is necessary to provide the light detector having a very high performance so as to constantly control the semiconductor light-emitting device appropriately.

Further, there is a recording pre-compensation method for performing recording pre-compensation according to the above-described multi-pulse recording method. This recording pre-compensation method is provided for a single recording speed. Therefore, if the recording speed is changed, such a change being recently demanded, optimum recording pre-compensation cannot be performed.

SUMMARY OF THE INVENTION

An object of the present invention is to provide a phase-change optical disc recording method for performing trial writing for obtaining an optimum recording condition.

A phase-change optical disc recording method according to the present invention, comprises steps of:

a) performing a trial writing operation on a phase-change optical disc using write and erase light-emitting powers, which together are varied according to predetermined variation ratios respectively;

b) reproducing signals relevant to said trial writing operation from said disc; and c) determining optimum ones of the write and erase light-emitting powers using the thus-reproduced signals.

Thus, the pair of the write and erase light-emitting powers are simultaneously varied according to the predetermined variation ratios during the trial writing in a trial writing region of the disc. As a result, conventional trial-writing firm sequences and conventional medium formats for conventional optical discs other than phase-change optical discs can be used, approximately as they are, for the phase-change optical discs. Further, the optimum ones of the write and erase light-emitting powers can be obtained efficiently, in a short time period.

Further, by making the predetermined variation ratios the same as each other, in a case where, due to degradation over time of LD powers and/or phase-change disc characteristics of a particular one of phase-change optical discs, a degree as to how an error in the LD power influences a resulting record mark formed in a recording layer of the phase-change optical disc is the same between the write light emitting power Pw and erase light-emitting power Pe, it is possible to efficiently and precisely obtain the optimum ones of the write and erase light-emitting powers.

Further, it is also possible to individually change the write and erase light-emitting powers. In this case, it is possible to determine the optimum light-emitting powers more finely.

Another object of the present invention is to provide an information recording apparatus in which it is possible to appropriately control more than three values of semiconductor light-emitting powers for emitting light in a phase-change optical disc for recording information to and reproducing information from the disc even with a light detector having a relatively low performance.

An information recording apparatus according to the present invention comprises:

driving means for driving a semiconductor light-emitting device at a write power and an erase power for recording information in a phase-change optical disc;

light detecting means for detecting light emitted from said semiconductor light-emitting means;

first storing means for storing an output signal of said light detecting means when substantially no information is written in said disc;

first comparing means for comparing a light power represented by the thus-stored output signal with a target value; and first feedback means for controlling said erase power using a comparison result of said first comparing means.

The first feedback means controls the erase power so that the comparison result of the first comparing means be such that the light power represented by the thus-stored output signal be equal to the target value. By controlling the erase power, a level of which is maintained during a relatively long period while a level of the write power often varies quickly in the multi-pulse recording method, it is possible to easily and accurately control the light emission level.

The information recording apparatus may further comprise:

averaging means for averaging the output signal of said light detecting means;

second comparing means for comparing an output signal of said averaging means with a target value; and second feedback means for controlling said write power using a comparison result of said second comparing means.

The second feedback means controls the write power so that the comparison result of the second comparing means be such that the output signal of the averaging means be equal to the target value. By controlling the write power using the averaged output signal of the light detecting means, it is possible to control the light emission level even if the light detecting means has a relatively low performance.

It is alternatively possible that the information recording apparatus further comprises:

averaging means for averaging the output signal of said light detecting means;

second comparing means for obtaining a difference between levels represented by the output signal of said first storing means and an output signal of said averaging means, further comparing said difference with a target value; and second feedback means for controlling said write power using a comparison result of said second comparing means.

The second feedback means controls the write power so that the comparison result of the second comparing means be such that the difference be equal to the target value. By using the difference between levels represented by the output signal of said first storing means and output signal of said averaging means, it is possible to fix the difference between the write and erase powers even if the target value of the erase power is changed.

The information recording apparatus may further comprise:

recording re-compensating means for converting one pulse for forming one record mark into a series of multiple pulses;

timing-signal generating means for generating a timing signal representing a time period or a head pulse of said series of multiple pulses;

second storing means for storing the output signal of said light detecting means during a time represented by said timing signal;

third comparing means for comparing a level represented by an output signal of said second storing means with a target value; and third feedback means for controlling said write power using a comparison result of said third comparing means.

The third feedback means controls the write power so that the comparison result of the third comparing means be such that the level represented by the output signal of the second storing means be equal to the target value. Instead of using the above-mentioned averaging means, by controlling the write power using the output signal of the light detection means of the head pulse of the series of the multiple pulses, which is the longest one in an ordinary head weighting multi-pulse recording method (later described), a level of which is thus maintained during a relatively long period, it is possible to easily and accurately control the light emission level even with the light detecting means having a relatively low performance.

The information recording apparatus may alternatively comprise:

recording re-compensating means for converting one pulse for forming one record mark into a series of multiple pulses;

timing-signal generating means for generating a timing signal representing a time period or a head pulse of said series of multiple pulses;

second storing means for storing the output signal of said light detecting means during a time represented by said timing signal;

third comparing means for obtaining a difference between levels represented by output signals of said first and second storing means, further comparing said difference with a target value; and third feedback means for controlling said write power using a comparison result of said third comparing means.

The third feedback means controls the write power so that the comparison result of the third comparing means be such that the difference be equal to the target value. By using the difference between levels represented by the output signals of said first and second storing means, it is possible to fix the difference between the write and erase powers even if the target value of the erase power is changed.

It is possible that said driving means controls a plurality of write and erase powers in a manner in which at least one or two powers among said plurality of write and erase powers are used as reference powers, said at least one or two powers being determined through said first feedback means and the others being determined using the thus-determined at least one or two powers and predetermined ratios between said plurality of write and erase powers.

Thereby, it is possible to perform an accurate light emission power control even if the multi-power recording pre-compensation or multi-pulse production is performed with high-speed emitting light power variation which cannot be appropriately measured by an ordinary one of the light detecting means.

Another object of the present invention is to provide recording method and apparatus in which it is possible to perform an appropriate recording pre-compensation for a plurality of different recording speeds.

A recording pre-compensating method according to the present invention to be used in a phase-change optical disc recording system, comprises steps of:

a) dividing one pulse for forming one record mark on a phase-change optical disc into a series of multiple pulses; and b) changing a recording speed at which said record mark is formed in said disc;

wherein said step a) uses a fixed reference clock signal for producing said series of multiple pulses when said step b) changes said recording speed, said reference clock signal having a frequency which is obtained as a result of multiplying by an integer a frequency of a recording synchronizing signal, which is one necessary for a highest one of a plurality of recording speeds, said step b) selecting one from among said plurality of recording speeds.

Thereby, it is not necessary to alter the reference clock signal when the recording speed is changed. Further, it is possible to perform the recording pre-compensation not depending on the recording speed but depending on the characteristics of the recording layer.

It is possible that said frequency of said fixed reference clock signal is determined according to at least one of a heating time and a cooling time required for forming an ideal shape of the record mark in a layer composition of said phase-change optical disc.

Thereby, it is possible to perform the recording pre-compensation at a pulse dividing rate optimum to the recording layer composition for a plurality of different recording speeds.

It is possible that a time period of each of low-level portions of said series of multiple pulses is fixed when the recording speed is changed, said low-level portions of said series of multiple pulses effecting cooling of a layer composition of said phase-change optical disc during a record-mark forming process.

Thereby, it is possible to give a necessary cooling effect, to the recording layer, which approximately depends on the recording layer composition.

It is possible that a time period of a longest pulse of said series of multiple pulses is fixed when the recording speed is changed. Thereby, it is possible to appropriately give a heat amount, necessary to facilitate a appropriate recording layer composition change, which is approximately fixed when the recording speed is changed.

Other objects and further features of the present invention will become more apparent from the following detailed description when read in conjunction with the accompanying drawings.

BRIEF DESCRIPTION OF THE DRAWINGS

FIGS. 1A and 1B illustrate LD light-emitting level variations and resulting record marks formed in a phase-change optical disc and a WORK optical disc;

FIG. 4 show an allocation of various regions on an optical disc;

FIG. 5 shows setting of write and erase LD powers in the operation shown in FIG. 3;

FIG. 8 shows setting of write and erase LD powers in the operation shown in FIGS. 6 and 7;

FIG. 21 shows a block diagram of a part of a phase-change optical disc apparatus in a fifteenth embodiment of the present invention;

FIGS. 22A, 22B, and 22C show waveforms of signals supplied in the apparatus shown in FIG. 21;

FIGS. 23A, 23B, 23C, 23D, 23E and 23F show signal waveforms for illustrating recording pre-compensation in the related art;

FIGS. 24A, 24B, 24C, 24D, and 24E show signal waveforms for illustrating recording pre-compensation in sixteenth and eighteenth embodiments of the present invention; and FIGS. 25A, 25B, 25C, 25D, 25E and 25F show signal waveforms for illustrating recording pre-compensation in a nineteenth embodiment of the present invention.

DESCRIPTION OF PREFERRED EMBODIMENTS

With reference to FIGS. 1A and 1B, waveforms of signals will now be described, which waveforms are input to a recording LD (semiconductor light-emitting device) for emitting light by which record marks are written in a phase-change optical disc and another conventional optical disc. In this description, the other conventional optical disc is, for example, the above-mentioned WORM optical disc. FIG. 1A shows a waveform for writing a record mark in the phase-change optical disc. As shown in the figure, the waveform has three LD powers: a write power Pw, an erase power Pe and a read power Pr. As mentioned above, the phase-change optical disc is a rewriteable disc. Therefore, when writing information to the phase-change optical disc, an overwriting manner is used. Specifically, when forming new record marks, a recording layer of the optical disc enters the amorphous phase, and when erasing existing record marks, the recording layer enters the crystal phase. In contrast to this, as shown in FIG. 1B, showing a waveform for writing a record mark in the WORM optical disc, the waveform has only two LD powers: a write power Pw and a read power Pr.

Figures 2A, 2B:
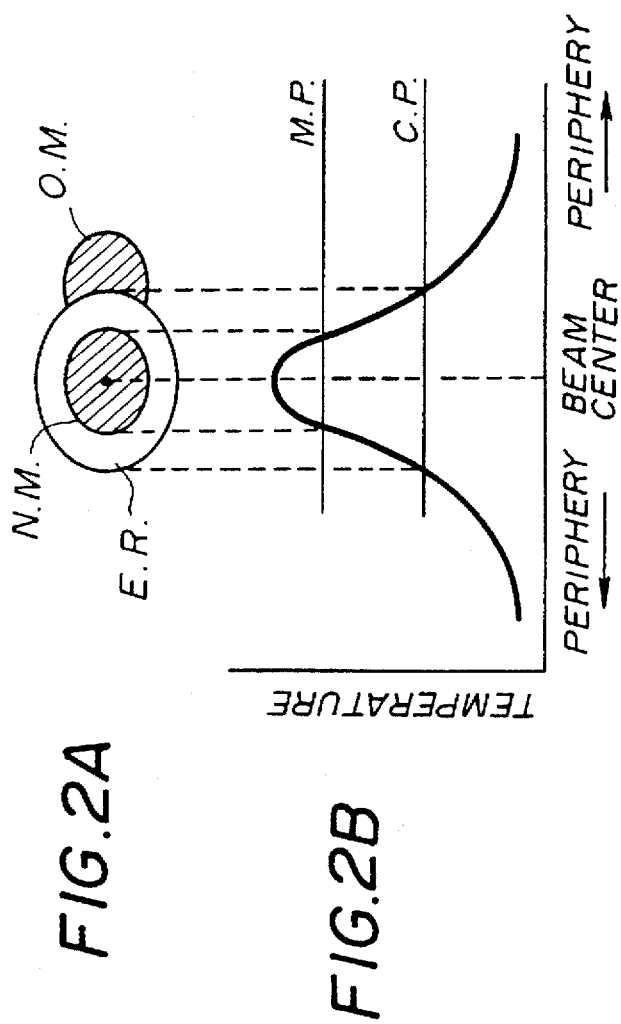
FIGS. 2A and 2B illustrate temperature distributions due to a beam spot and resulting record marks formed in a phase-change optical disc.

With reference to FIGS. 2A and 2B, a recording principle of the recording of record marks in the phase-change optical disc will now be described. FIG. 2A shows a plan view of a state on the recording layer in which an existing mark (old mark) O.M. was previously formed and then a new mark N.M. is formed. FIG. 2B shows a temperature of the recording layer when light beams of an isolated pulse having the writing power Pw without the erase power Pe is instantaneously applied to the recording layer of the phase-change optical disc. As a result of the instantaneous application of light beams, as shown in FIG. 2A, the new mark N.M. is formed on and around the center of the light beams, and an erased ring E.R. is formed around the new mark N.M. As a result, a part of the old mark O.M. is erased, as shown in the figure. When the recording layer is heated above a melting point by using the write power Pw and then is cooled rapidly, the recording layer enters the amorphous phase. When the recording layer is heated to a crystallizing temperature lower than the melting point by the erase power Pe and then is cooled, the recording layer becomes the crystal phase. As mentioned above, the reflectiveness is different between the two transition phases and this property of the recording layer is used for the data recording.

Thus, the two LD powers, the write power Pw and erase power Pe are used for recording data in the phase-change optical disc. A state of the recording layer resulting from the data recording closely depends on the two LD powers. If the two LD powers are not appropriately controlled to be optimum, old marks cannot be completely erased or new marks cannot be properly formed. As a result, data reproduction errors may occur when reproducing thus-recorded data. Each of the write power and erase power may include a plurality of values which may be obtained using proportions from a respective basic value.

Figure 3:
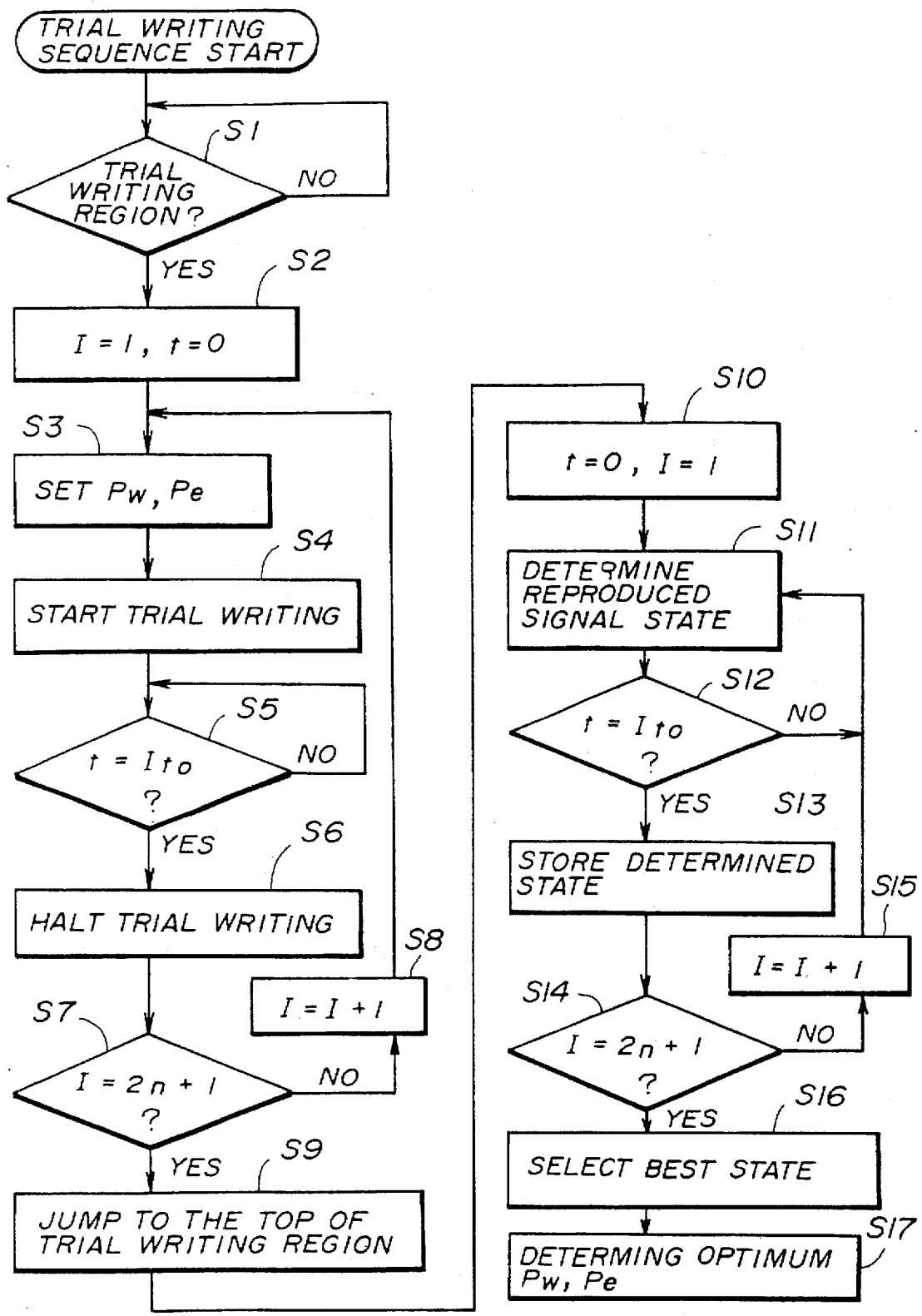
FIG. 3 shows an operation flowchart of a phase-change optical disc trial writing method in first and second embodiments of the present invention.

FIG. 3 shows a flowchart of a first embodiment of a phase-change optical disc trial writing method according to the present invention.

Before performing actual data recording, a trial writing is performed so as to obtain optimum ones of the writing power Pw and erasing power Pe at the present time. In the first embodiment, in the trial writing, the writing power Pw and erasing power Pe are simultaneously varied and thus mark recording is performed. Then, after the recording, a thus-recorded signal is reproduced and optimum ones of the writing power Pw and erasing power Pe are obtained using the reproduced result.

When an existing phase-change optical disc is replaced with a new one in a disc drive apparatus, for example, a host computer gives the drive apparatus instructions for performing trial writing on the new phase-change optical disc. As mentioned above, in a standardized optical disc, a special trial writing region is provided in a medium format of the disc other than a region to be used for actual data recording. Then, the drive apparatus emits light using an LD to the trial writing region. FIG. 4 shows an example of a medium information zone layout of a data optical disc (90 mm). An inner test zone for a drives shown in the layout is used as the trial writing region.

In a step (a term 'step' will be omitted, hereinafter) S1 of FIG. 3, a pickup head of the drive apparatus is moved so as to reach the top of the trial writing region of the phase-change optical disc.

Then, in S2, a stage number I=1. In S3, according to a setting table shown in FIG. 5, predetermined writing power Pw and erasing power Pe for trial writing are set for the LD power and thus, in S4, the trial writing is started (at the time 't'=0). As shown in FIG. 5, the setting powers vary as the stage I changes through stages 1 through 2n+1. In the variation, the write power Pw is obtained by multiplying a reference power Pwref by 1+Na while the erase power Pe is obtained by multiplying a reference power Peref by 1+Nb. Thus, each of the write and erase powers varies in 2n+1 stages with a respective one of variation ratios 'a' and 'b'.

Examples of specific values of the write and erase powers, Pw and Pe are '10 mW' and '6 mW' respectively. Further, examples of specific values of the variation ratios 'a' and 'b' are '0.2' and '0.2' respectively. Specific values of the write and erase powers, Pw and Pe depend on a recording layer characteristics of a particular recording medium (phase-change optical disc). In the embodiment, the write and erase powers are changed in a range in which these powers may have values according to the characteristics of the recording layer in steps determined by the values 'a' and 'b'. For example, the write power Pw is changed between '8 mW' and '12 mW', and the erase power Pe is changed between '4.8 mW' and '7.2 mW', The variation manner is not limited to that shown in FIG. 5 in which the setting powers increase as the stage number I is increased, and other various variation manners can be used. Further, the predetermined values 'a' and 'b' may be arbitrarily predetermined in the first embodiment. The predetermined values 'a' and 'b' may be the same as each other and also may be different from each other. There may be a case where, due to characteristics of a particular one of the phase-change optical discs, a degree as to how an error in the LD power influences a resulting record mark formed in the recording layer of the phase-change optical disc are different between the writing power Pw and erasing power Pe. In such a case the predetermined value 'a' may be different from the predetermined value 'b' appropriately.

Further, data to be written in the trial writing in S4 may be arbitrary, for example, may correspond to a specific pattern.

In S5, it is determined whether or not the time 't'=I·$t_0$. If it is determined that the time is I·$t_0$ in S5, the trial writing is halted in S6. Thus, the trial writing has been continued for a period of $t_0$. Then in S7, it is determined whether or not the stage number I=2n+1. If S7 determines that the stage number I is not 2n+1, the stage number I is incremented by one in S8. Then, again according to FIG. 5, new ones of the write and erase powers Pw and Pe are set and the trial writing is restarted. Thus, the loop of S3, S4, S5, S6, S7 and S8 is repeated 2n+1 times and thus various (2n+1) values of each of the write and erase powers are used in the trial writing according to FIG. 5, and the trial writing using each set of the write and erase powers Pwref(1+Na) and Peref(1+Nb) is continued for the unit time $t_0$ in a respective stage.

During the 2n+1 writing operations, the pickup head of the drive apparatus moves from the top of the trial writing region in this region of the phase-change optical disc appropriately.

When the 2n+1 trial writing operations have been finished, S7 determines that I=2n+1. As a result, in S9, the pickup head of the drive apparatus is jumped to the top of the trial writing region of the phase-change optical disc. Then, in S10, the time 't' is initialized to be '0' and the stage number is also initialized to be '1'.

Then, in S11, the pickup head is used to reproduce a signal recorded in the trial writing region during the stage I and a state of the thus-reproduced signal is determined. In S12, it is determined whether or not the time 't' is I·$t_0$. Thus, the pickup head reproduces the relevant signal recorded in the corresponding stage in a loop of S11 and S12 as a pickup head moving speed is fixed. If it is determined that the time 't' is I·$t_0$ in S12, the state of the thus-reproduced signal determined in S11 is stored. Then, in S14, it is determined whether or not the stage number I=2n+1. If it is not determined that I=2n+1, the stage number I is incremented by one in S15, and S11 is again executed. Thus, a loop of S11, S12, S13, S14, and S15 is repeated 2n+1 times, and thus 2n+1 states of reproduced signals relevant to the 2n+1 sets of the write and erase powers according to FIG. 5 are stored.

After the reproducing, state determining and storing operations have been finished for the 2n+1 signals and it has been determined in S14 that I=2n+1, it is determined in S16 which one of the stored 2n+1 states of reproduced signals is an optimum one which can represent the data recorded in the trial writing in S4 most precisely. In other words, in the optimum state, the formed record mark has an ideal shape. The thus-determined state of the reproduced signal is one which was reproduced in a certain stage I among the 2n+1 stages. Then, in S17, the values of the write and erase powers Pwref·(1+Na) and Peref·(1+Nb) used in a stage I corresponding to this certain stage I are determined as being optimum ones of the write and erase powers Pw and Pe. The determined values of the write and erase powers are then used in an actual data recording performed in the relevant phase-change optical disc through the relevant drive apparatus.

In the first embodiment, a pair of the write and erase powers are simultaneously varied with predetermined vibration ratios 'a' and 'b' in S3 during the trial writing in the trial writing region of the disc. As a result, conventional trial-writing firm sequences and conventional medium formats for conventional optical discs other than phase-change optical discs can be used, approximately as they are, for the phase-change optical discs. Further, the optimum ones of the write and erase powers can be obtained efficiently, in a short time period.

A second embodiment of a phase-change optical disc trial writing method according to the present invention will now be described. The second embodiment is the same as the above-described first embodiment except for a matter that in the second embodiment, the predetermined values 'a' and 'b' are the same as each other. Thus, the value of the write power Pwref·(1+Na) varies in proportion to variation of value of the read power Peref·(1+Nb) as the stage I is changed.

By making the predetermined values 'a' and 'b' the same as each other, in a case where, due to degradation over time of LD powers and/or phase-change disc characteristics of a particular one of the phase-change optical discs, a degree as to how an error in the LD power influences a resulting record mark formed in the recording layer of the phase-change optical disc is the same between the writing power Pw and erasing power Pe, it is possible to efficiently, precisely obtain the optimum ones of the write and erase powers.

Figure 6:
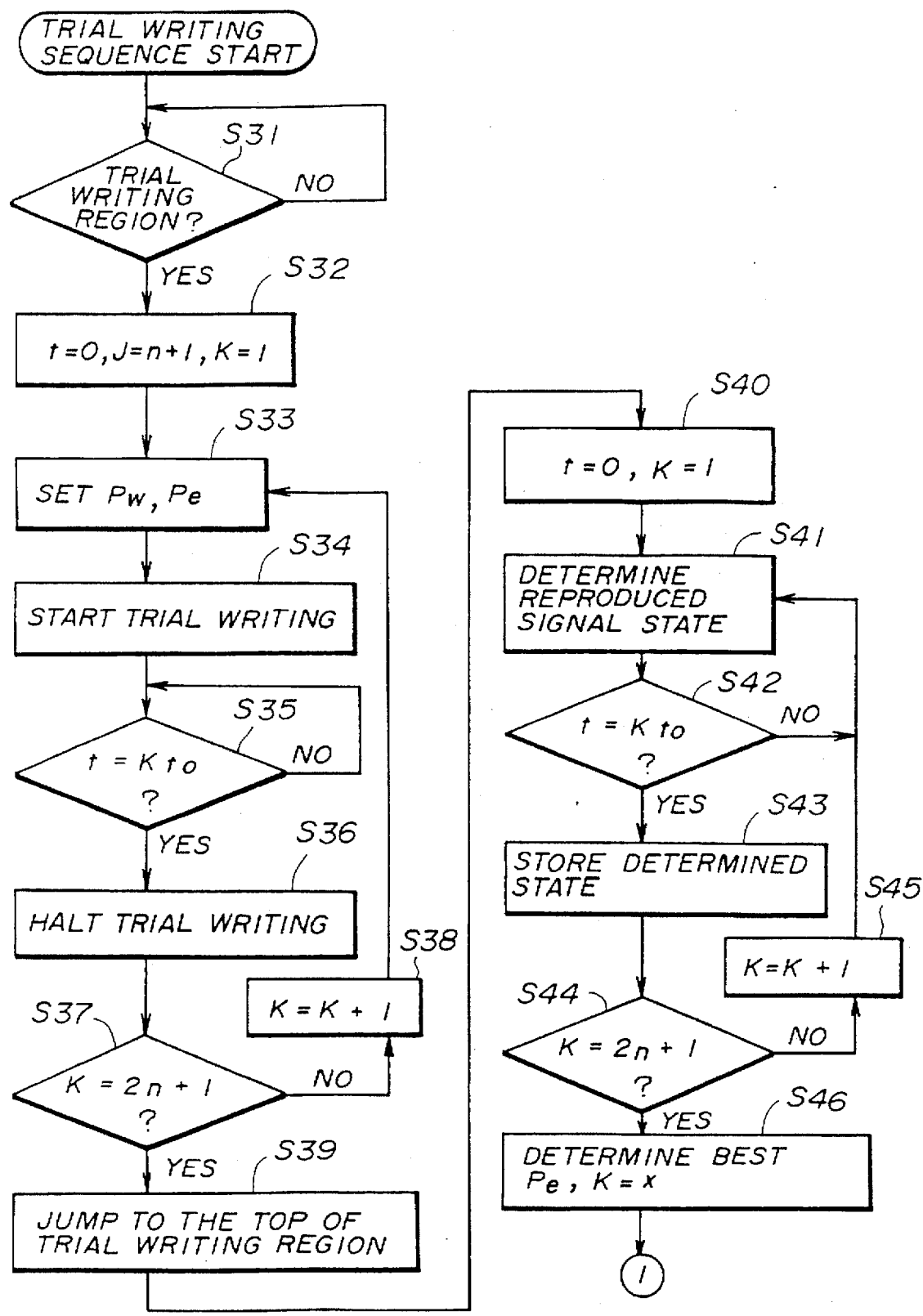
FIGS. 6 and 7 show an operation flowchart of a phase-change optical disc trial writing method in a third embodiment of the present invention.
Figure 7:
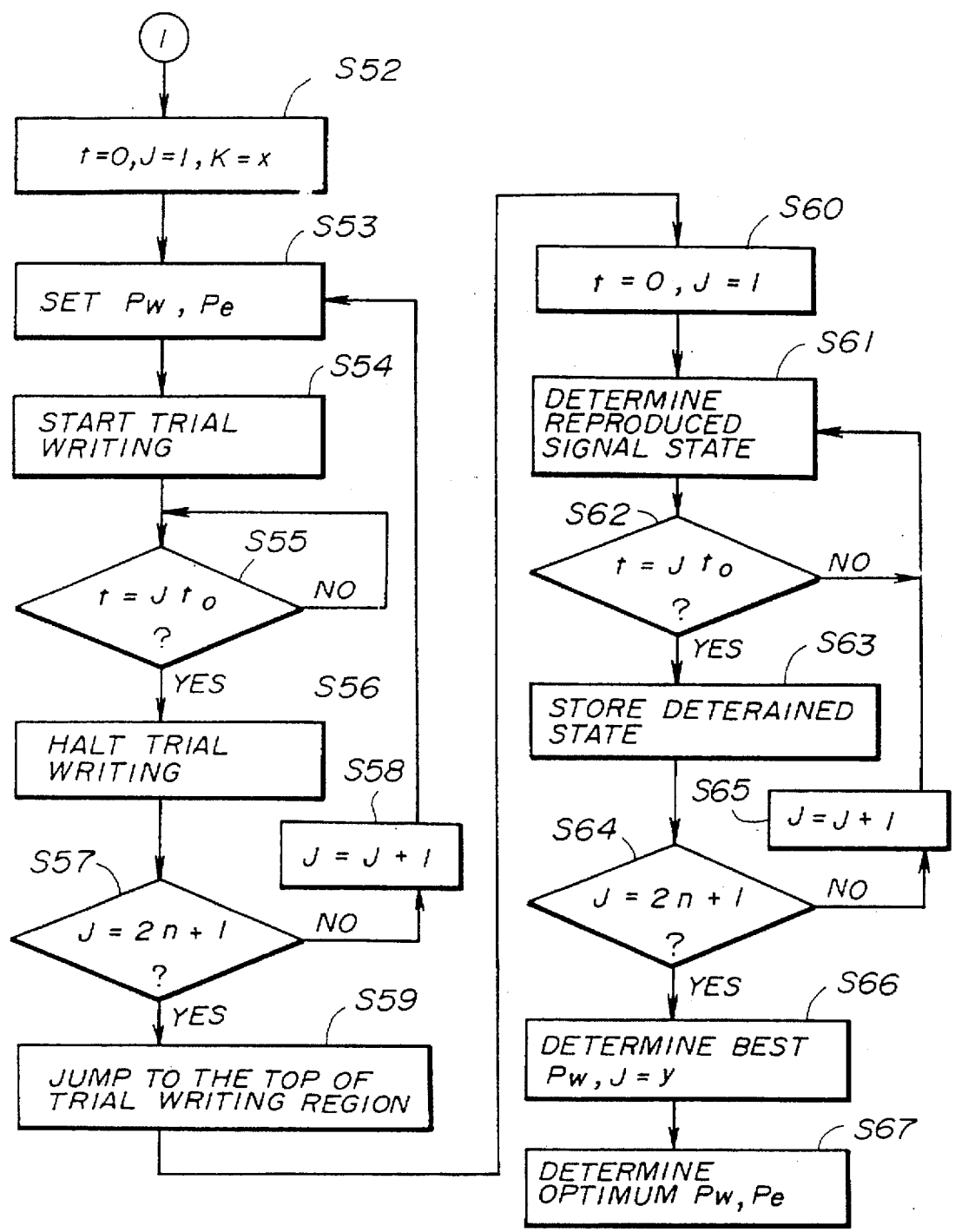

With reference to FIGS. 6, 7 and 8, third, fourth, fifth, sixth, seventh, eighth and ninth embodiments of phase-change optical disc recording methods according to the present invention will now be described.

In these third through ninth embodiments, in an algorithm for obtaining optimum values of the write and erase LD powers, the trial writing is performed as the write LD power and erase LD power are varied independently. Then, after reproducing thus-recorded data, using the reproduced data, the optimum LD powers are obtained. In the algorithm, an optimum value of a first one of the write and erase powers is first determined as a result of varying the first one with the second one being fixed to a reference value. Then, an optimum value of the second one of the write and erase powers is determined as a result of varying the second one with the first one being fixed to the thus-obtained optimum value. In each of the third through seventh embodiments, either one of the write and erase LD powers may be selected as the first one, an optimum value of which is to be first determined. In each of the eight and ninth embodiments, an optimum value of the erase LD power is first determined.

The embodiments will be described assuming that an optimum value of the erase power is first determined. However, with regard to each of the third through seventh embodiments, it is also possible to first determine an optimum value of the write power. In general, a trial writing sequence in each of the third through ninth embodiments is similar to twice proceeding through the trial writing sequence shown in FIG. 3 in the first embodiment.

In S31 of FIG. 6, the pickup head of the drive apparatus is moved so as to reach the top of the trial writing region of the phase-change optical disc.

Then, in S32, a stage number 'J' of the write power Pwref·(1+Na) is n+1; and a stage number 'K' of the erase power Peref·(1+Nb) is 1. In S33, according to a setting table shown in FIG. 8, predetermined writing LD power Pw and erasing LD power Pe for the trial writing are set and thus, in S34, the trial writing is started (at the time 't'=0). With reference to FIG. 8, the stage number 'J' of the write LD power Pwref·(1+Na) is fixed to be n+1 and thus the setting power is fixed to be Pwref, during a repetition of a loop of S33, S34, S35, S36, S37 and S38. In fact, as shown in FIG. 8, the value of 'N' is '0' when the stage number 'J' is n+1, and thus Pwref·(1+Na)=Pwref. With regard to the setting power of the erase LD power Peref·(1+Nb), the stage number 'K' of the erase LD power Peref·(1+Nb) varies from 1 through 2n+1 and thus the setting power varies accordingly, during the repetition of the loop of S33, S34, S35, S36, S37 and S38. In fact, as shown in FIG. 8, the value of 'N' varies from −n through n as the stage number 'K' varies 1 through 2n+1, and thus Peref·(1+Nb) varies from Peref·(1−nb) through Peref·(1+nb).

In the variation, the erase power Pe is obtained by multiplying the reference power Peref by 1+Nb. Thus, the erase power varies in 2n+1 stages with the variation ratio 'b'. The variation manner is not limited to that shown in FIG. 8 in which the setting power increases as the stage number K is increased, and other various variation manners can be used.

In S35, it is determined whether or not the time 't'=K·$t_0$. If it is determined that the time is K·$t_0$ in S35, the trial writing is halted in S36. Thus, the trial writing has been continued for a period of $t_0$. Then in S37, it is determined whether or not the stage number K=2n+1. If S37 determines that the stage number K is not 2n+1, the stage number K is incremented by one in S38. Then, again according to FIG. 8, a new one of the erase power Pe is set and the trial writing is restarted. Thus, the loop of S33, S34, S35, S36, S37 and S38 is repeated 2n+1 times and thus various (2n+1) values of the erase power are used in the trial writing according to FIG. 8, and the trial writing using each value of the erase power Peref(1+Nb) is continued for the unit time $t_0$ in a respective stage.

During the 2n+1 writing operations, the pickup head of the drive apparatus moves from the top of the trial writing region in this region of the phase-change optical disc appropriately.

When the 2n+1 trial writing operations have been finished, S37 determines that K=2n+1. As a result, in S39, the pickup head of the drive apparatus is jumped to the top of the trial writing region of the phase-change optical disc. Then, in S40, the time 't' is initialized to be '0' and the stage number 'K' is also initialized to be '1'.

Then, in S41, the pickup head is used to reproduce a signal recorded in the trial writing region during the stage K and a state of the thus-reproduced signal is determined. In S42, it is determined whether or not the time 't' is K·$t_0$. Thus, the pickup head reproduces the relevant signal recorded in the corresponding stage in a loop of S41 and S42 as a pickup head moving speed is fixed. If it is determined that the time 't' is K·$t_0$ in S42, the state of the thus-reproduced signal determined in S41 is stored. Then, in S44, it is determined whether or not the stage number K=2n+1. If it is not determined that K=2n+1, the stage number K is incremented by one in S45, and S41 is again executed. Thus, a loop of S41, S42, S43, S44, and S45 is repeated 2n+1 times, and thus 2n+1 states of reproduced signals relevant to the 2n+1 values of the erase powers and the fixed write power of Pwref according to FIG. 8 are stored.

After the reproducing, state determining and storing operations of the 2n+1 signals have been finished and it has been determined in S44 that K=2n+1, it is determined which one of the stored 2n+1 states of reproduced signals is an optimum one which can represent the data recorded in the trial writing in S34 most precisely. In other words, in the optimum state, the formed record mark has an ideal shape. The thus-determined state of the reproduced signal is one which was reproduced in a certain stage K=x among the 2n+1 stages. Then, in S46, the value of the erase power Peref·(1+Nb) used in the corresponding stage K=x is determined as being the optimum one of the erase power Pe.

In S52 of FIG. 7, the pickup head of the drive apparatus is moved so as to reach the top of the trial writing region of the phase-change optical disc.

Then, in S52, the stage number 'J' of the write power Pwref·(1+Na) is 1; and the stage number 'K' of the erase power Peref·(1+Nb) is fixed to be the 'x' which was determined in S46. In S53, according to the setting table shown in FIG. 8, predetermined write LD power Pw and erase LD power Pe for the trial writing are set and thus, in S54, the trial writing is started (at the time 't'=0). With reference to FIG. 8, the stage number 'K' of the erase LD power Peref·(1+Nb) is fixed to be 'x' and thus the setting power is fixed to be Peref·(1+Nb) where 'N' is obtained from FIG. 8 for the stage number K=x, during a repetition of a loop of S53, S54, S55, S56, S57 and S58. N obtained from FIG. 8 for the stage number K=x is x−n−1. Therefore, the erase LD power is fixed to be Peref·(1+(x−n−1)·b), which is the optimum erase power determined in S46 in FIG. 6.

With regard to the setting power of the write LD power Pwref·(1+Na), the stage number 'J' of the write LD power Pwref·(1+Na) varies from 1 through 2n+1 and thus the setting power varies accordingly, during the repetition of the loop of S53, S54, S55, S56, S57 and S58. In fact, as shown in FIG. 8, the value of 'N' varies from −n through n as the stage number 'J' varies from 1 through 2n+1, and thus Pwref·(1+Na) varies from Pwref·(1−na) through Pwref·(1+na).

In the variation, the write power Pw is obtained by multiplying the reference power Pwref by 1+Na. Thus, the write power varies in 2n+1 stages with the variation ratio 'a'. The variation manner is not limited to that shown in FIG. 8 in which the setting power increases as the stage number J is increased, and other various variation manners can be used.

In S55, it is determined whether or not the time 't'=J·$t_0$. If it is determined that the time is J·$t_0$ in S55, the trial writing is halted in S36. Thus, the trial writing has been continued for a period of $t_0$. Then in S57, it is determined whether or not the stage number J=2n+1. If S57 determines that the stage number J is not 2n+1, the stage number J is incremented by one in S58. Then, again according to FIG. 8, a new one of the write power Pw is set and the trial writing is restarted while the erase power Pe is fixed to be Peref·(1+(x−n−1)·b).

Thus, the loop of S53, S54, S55, S56, S57 and S58 is repeated 2n+1 times and thus various (2n+1) values of the write power Pw are used while the erase power Pe is fixed to be Peref·(1+(x−n−1)·b). In the trial writing according to FIG. 8, the trial writing using each value of the write power Pwref(1+Na) is continued for the unit time $t_0$ in a respective stage.

During the 2n+1 writing operations, the pickup head of the drive apparatus moves from the top of the trial writing region in this region of the phase-change optical disc appropriately.

When the 2n+1 trial writing operations have been finished, S57 determines that J=2n+1. As a result, in S59, the pickup head of the drive apparatus is jumped to the top of the trial writing region of the phase-change optical disc. Then, in S60, the time 't' is initialized to be '0' and the stage number 'J' is also initialized to be '1'.

Then, in S61, the pickup head is used to reproduce a signal recorded in the trial writing region during the stage J and a state of the thus-reproduced signal is determined. In S62, it is determined whether or not the time 't' is J·$t_0$. Thus, the pickup head reproduces the relevant signal recorded in the corresponding stage in a loop of S61 and S62 as a pickup head moving speed is fixed. If it is determined that the time 't' is J·$t_0$ in S62, the state of the thus-reproduced signal determined in S61 is stored. Then, in S64, it is determined whether or not the stage number J=2n+1. If it is not determined that J=2n+1, the stage number J is incremented by one in S65, and S61 is again executed. Thus, a loop of S61, S62, S63, S64, and S65 is repeated 2n+1 times, and thus 2n+1 states of reproduced signals relevant to the 2n+1 values of the write powers and the fixed erase power of Peref·(1+(x−n−1)·b) according to FIG. 8 are stored.

After the reproducing, state determining and storing operations of the 2n+1 signals have been finished and it has been determined in S64 that J=2n+1, it is determined which one of the stored 2n+1 states of reproduced signals is an optimum one which can represent the data recorded in the trial writing in S54 most precisely. In other words, in the optimum state, the formed record mark has an ideal shape. The thus-determined state of the reproduced signal is one which was reproduced in a certain stage J=y among the 2n+1 stages. Then, in S66, the value of the write power Pwref·(1+Na) used in the corresponding stage J=y is determined as being the optimum one of the write power Pw.

The determined values of the write and erase powers are then used in recording actual data in the relevant phase-change optical disc through the relevant drive apparatus.

In the third embodiment of the present invention, as described above, the optimum write and erase LD powers are individually obtained. Which one of the optimum LD write and erase powers is first obtained is not limited to that in the above-described case and may be determined arbitrarily. In the third embodiment, the optimum ones of the write and erase LD powers can be finely obtained using firm sequences and medium formats for phase-change optical discs.

In each of the fourth, fifth, sixth and seventh embodiments, how to determine the best state in S46 of FIG. 6 of the signals reproduced in S41 is defined.

Figure 9:
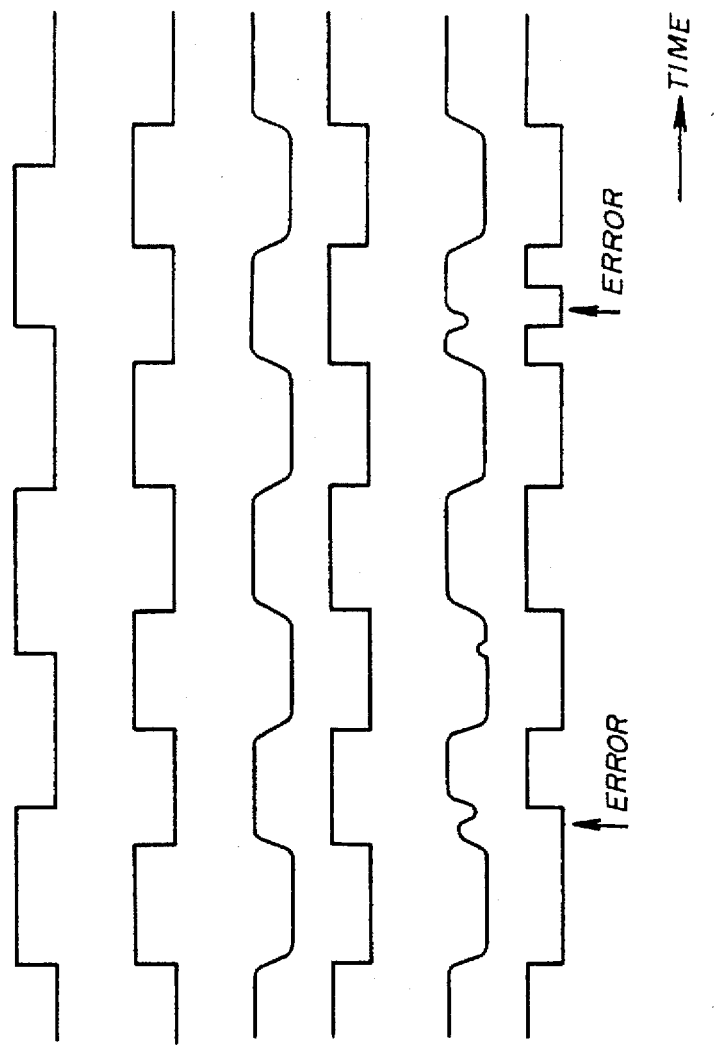
FIGS. 9A, 9B, 9C, 9D, 9E and 9F show waveforms for illustrating a phase-change optical disc trial writing method in a fourth embodiment of the present invention.

With reference to FIGS. 9A, 9B, 9C, 9D, 9E and 9F, the fourth embodiment will now be described. FIG. 9A shows a waveform of data which was previously written in the relevant phase-change optical disc. FIG. 9B shows a waveform of data which is written in this optical disc over the previously written data shown in FIG. 9A. FIG. 9C shows a waveform of ideal data which is obtained as a result of reproducing the data shown in FIG. 9B from the optical disc. FIG. 9D shows a waveform of data which is obtained as a result of converting the data shown in FIG. 9C into binary data.

FIG. 9E shows a waveform of data which is obtained as a result of reproducing the data shown in FIG. 9B from the optical disc. However, the data shown in FIG. 9E includes influence by the data shown in FIG. 9A which was previously written in the optical disc. If the data shown in FIG. 9B is written in the optical disc over the previously written data shown in FIG. 9A in a condition in which the previously written data is not appropriately erased, and the thus-written data is reproduced, the reproduced signal may include influence by the previously written data as shown in FIG.

9E. FIG. 9F shows a waveform of data which is obtained as a result of converting the data shown in FIG. 9E into binary data.

Thus, when data is written in the phase-change optical disc over previously written data in a condition in which an erase LD power used is not an optimum one, the previously written data may not be appropriately erased. As a result, influence by the previously written data may appear in a signal which is obtained as a result of reproducing data from the phase-change optical disc having the data overwritten therein as mentioned above. Further, as a result of converting the reproduced signal into binary data, the resulting binary data has a waveform such as that shown in FIG. 9F which is different from the original overwritten data having a waveform such as that shown in FIG. 9B. The difference is indicated in FIG. 9F as errors.

As the erase LD power used in writing the overwritten data such as that shown in FIG. 9B is an improved one, an amount of such errors as those shown in FIG. 9F should be smaller. The fourth embodiment uses such cause and effect. In the trial writing in the fourth embodiment, before starting the trial writing sequence shown in FIG. 6, the trial writing region has data which was previously written therein. Then, in S34, the data is overwritten with relevant ones of the erase and write powers.

Then, after the writing processes and reproducing process have been finished, in reproduced signal state determination, storage and best erase power determination processes in S41 through S46 of FIG. 6, a state of each of the reproduced signals is compared with the others in a manner which will now be described. It is determined which one of the reproduced signals has a waveform which is most similar to one of the data overwritten in S34. In other words, a reproduced signal which has a waveform including a smallest amount of errors is determined to be the best one in S46. The errors correspond to differences between the waveform written in S34 and that of the relevant signal reproduced in S41. The erase power Pe which is used in the stage in S34 corresponding to the stage in which the best reproduced signal is obtained in S41 is determined as being the optimum one in S46.

In order to improve an accuracy in the determination of the optimum erase power in S46, in the fourth embodiment, predetermined data which is written in S36 using relevant ones of the erase and write powers may have a special pattern which may result in a large amount of errors when the erase power is different from an optimum one.

Thus, in the fourth embodiment, the optimum write and erase LD powers are obtained such that an amount of resulting reproduced errors in the reproduced signal may be the smallest. As a result, it is possible to obtain the optimum write and erase LD powers such that insufficiently erasing of previous record marks and forming of inappropriate shapes of record marks can be prevented.

Figure 10:
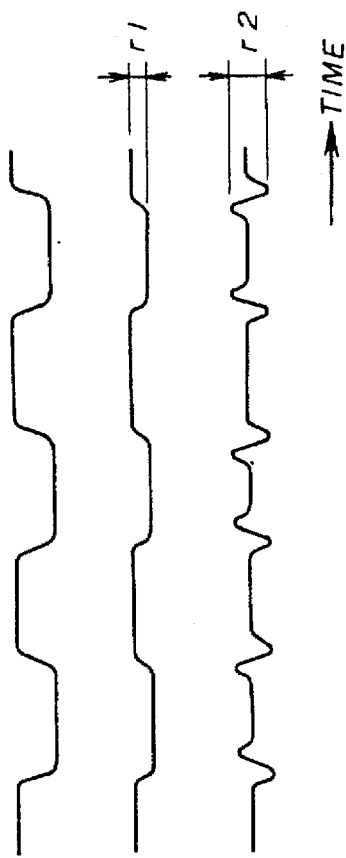
FIGS. 10A, 10B and 10C show waveforms for illustrating a phase-change optical disc trial writing method in fifth and sixth embodiments of the present invention.

With reference to FIGS. 10A, 10B and 10C, the fifth and sixth embodiments will now be described. FIG. 10A shows a waveform of data which was previously written in the phase-change optical disc. FIG. 10B shows a waveform of data which is obtained as a result of reproducing data from the phase-change optical disc after erasing the previously written data shown in FIG. 10A with an erase LD power. FIG. 10C shows a waveform of data obtained as a result of differentiating the data shown in FIG. 10B.

The writing process in the trial writing sequence shown in FIG. 6 in the fifth embodiment is actually an erasing process. Therefore, if the erasing has been performed with the optimum erase LD power in S34, no significant data should be present in the signal reproduced in S41. In other words, if the erasing is performed with an erase LD power which is not the optimum one, significant unerased information should be present in the reproduced signal. The fifth embodiment uses this cause and effect. In the trial writing in the fifth embodiment, before starting the trial writing sequence shown in FIG. 6, the trial writing region has data which was previously written therein. Then, in S34, the previously written data is erased with a relevant one of the erase powers and no new data is written in the trial writing region of the phase-change optical disc.

Then, after the writing processes (actually erasing processes in this embodiment) and reproducing process have been finished, in the reproduced signal state determination, storage and best erase power determination processes in S41 through S46 of FIG. 6, a state of each of the reproduced signals is compared with the others in a manner which will now be described. A magnitude of the reproduced signal, such as 'r1' shown in FIG. 10B, is measured for each stage. One of the reproduced signals which has a smallest magnitude is determined as being the best one. The erase power Pe which is used in the stage in S34 corresponding to the stage in which the best reproduced signal is obtained in S41 is determined as being the optimum one in S46.

Thus, in the fifth embodiment, the erasing operation is performed on the mark recorded trial writing region and the erase LD power is changed during the erasing operation. Then, reproduced signal levels are obtained as a result of reproducing signals from this trial writing region. The thus-obtained signal levels indicate insufficiency of the performed erasing operation. By using the thus-obtained signal levels, it is possible to obtain the optimum erase LD power.

Similarly, the writing process in the trial writing sequence shown in FIG. 6 in the sixth embodiment is actually an erasing process. Therefore, as mentioned above, if the erasing has been performed with the optimum erase LD power in S34, no significant data should be present in the signal reproduced in S41. In other words, if the erasing is performed with an erase LD power which is not the optimum one, significant unerased information should be present in the reproduced signal. The sixth embodiment also uses this cause and effect. In the trial writing in the sixth embodiment, before starting the trial writing sequence shown in FIG. 6, the trial writing region has data which was previously written therein. Then, in S34, the previously written data is erased with a relevant one of the erase powers and no new data is written in the trial writing region of the phase-change optical disc.

Then, after the writing processes (actually erasing processes in this embodiment) and reproducing process have been finished, in the reproduced signal state determination, storage and best erase power determination processes in S41 through S46 of FIG. 6, a state of each of the reproduced signals is compared with the others in a manner which will now be described. A magnitude of a signal obtained as a result of differentiating the reproduced signal, such as 'r2' shown in FIG. 10C, is measured for each stage. One of the reproduced signals, a differentiation result of which has a smallest magnitude is determined as being the best one. The erase power Pe which is used in the stage in S34 corresponding to the stage in which the best reproduced signal is obtained in S41 is determined as being the optimum one in S46.

Figure 11:
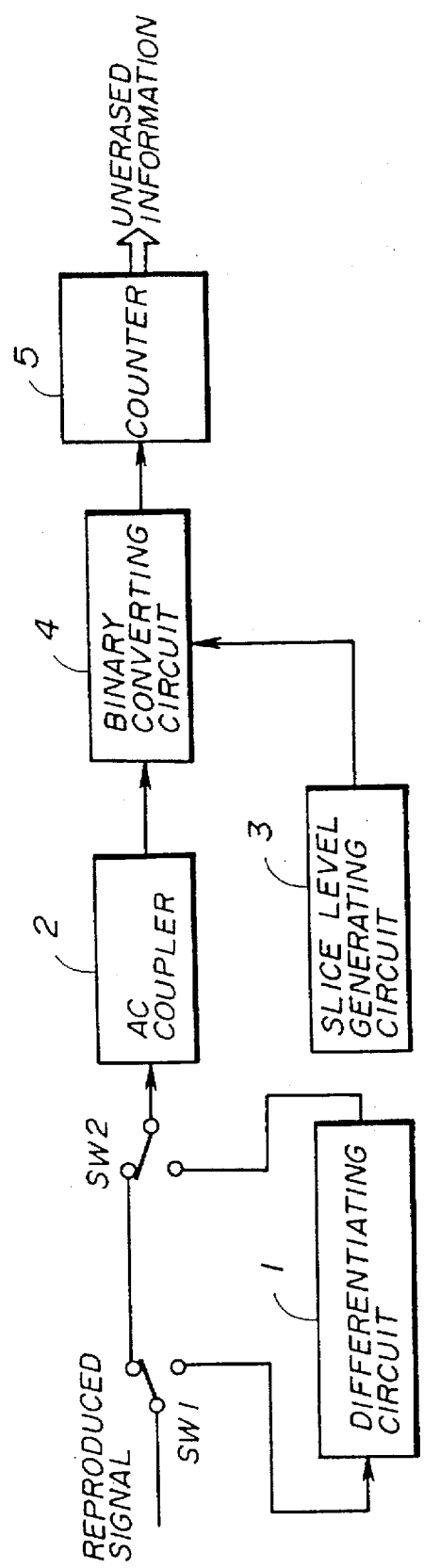
FIG. 11 shows a block diagram of a circuit usable in the fifth and sixth embodiments of the present invention.

FIG. 11 shows a block diagram of a construction for detecting unerased information such as that shown in FIGS.

10B and 10C used in each of the fifth and sixth embodiments. A reproduced signal obtained in S41 is either directly in the fifth embodiment or via a differentiating circuit 1 in the sixth embodiment supplied to an AC coupler 2. This switching is performed by change-over switches SW1 and SW2. The AC coupler removes low-frequency band components from either the reproduced signal or the differentiated reproduced signal. A simple actual example of the AC coupler 2 is a capacitor. The AC coupler 2 thus removes an offset component from the signal and thus only a transition component remains.

A slice level generating circuit 3 supplies a threshold level which is then compared with a signal transition level supplied by the AC coupler 2 in a binary converting circuit 4. When the signal transition level supplied by the AC coupler is larger than the slice level supplied by the slice level generating circuit, the binary converting circuit 4 supplies a detection signal into a counter 5. The counter 5 counts a number of the detection signals supplied by the binary converting circuit 4.

Generally, it is likely that the transition level supplied by the AC coupler 2 becomes approximately the same levels successively. The threshold level supplied by the slice level generating circuit 3 is changed, for example, is decreased in a predetermined step, and the counter 5 counts a number of the detection signals supplied by the binary converting circuit 4 for each threshold level during a predetermined time period. When the threshold level passes through these transition levels while of the threshold level is being decreased, the number counted by the counter 5 during the predetermined period increases extremely. It is determined that the threshold level used in this time is approximately equal to the transition levels. Thus, it is possible to measure the transition levels.

The thus-determined level is used in each of the fifth and sixth embodiments for determining as an amount of unerased information present in the signal reproduced from the phase-change optical disc after performing erasing with a relevant erase LD power thereon.

Thus, in the sixth embodiment, the erasing operation is performed on the mark recorded trial writing region and the erase LD power is changed during the erasing operation. Then, reproduced signal levels are obtained as a result of reproducing signals from this trial writing region. The thus-obtained signal levels indicate insufficiency of the performed erasing operation. By using values resulting from differentiating the thus-obtained signal levels, it is possible to obtain the optimum erase LD power more precisely.

The seventh embodiment will now be described. In any of the above-described third through sixth embodiments, there may be a case where a plurality of states of the reproduced signals are determined in S46 as being the best ones. Specifically, a plurality of states of the reproduced signal may fulfill an optimum erased result condition. In such a case, it is necessary to determine one from among the plurality of states of the reproduced signals so that the optimum erase power used in the corresponding stage may be determined. The determined optimum erase power will be used in the determination of the optimum write power and/or in an actual data recording operation. In the seventh embodiment, how to determine one from among such a plurality of final candidates of the optimum erase power is defined.

Generally speaking, as an LD power applied to a phase-change optical disc increases, a life time thereof disadvantageously decreases. Therefore, in the seventh embodiment, one state is selected from among the plurality of states of the reproduced signals fulfilling the optimum erased result condition in a manner which will now be described. The plurality of states of reproduced signals are obtained as a result of performing the reproducing operation in a plurality of stages, respectively. Then, the erase LD powers used in the plurality of stages are compared with one another, and the minimum one thereof obtained as a result of the comparison is determined as the optimum erase LD power. As a result, it is possible to use the optimum erase power which may elongate a life time of a relevant phase-change optical disc, and also to reduce power consumption for supplying the LD powers.

The eighth embodiment will now be described. In the eighth embodiment, it is previously defined that the optimum erase LD power is first obtained and then the optimum write LD power is obtained with the thus-obtained optimum erase LD power according to the flowcharts shown in FIGS. 6 and 7.

Figure 12A:
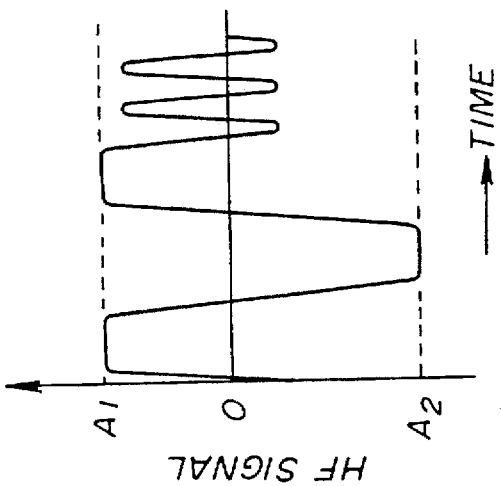
FIGS. 12A, 12B and 12C show waveforms illustrating asymmetries in reproduced signals for illustrating a phase-change optical disc trial writing method in a ninth embodiment of the present invention.
Figure 12B:
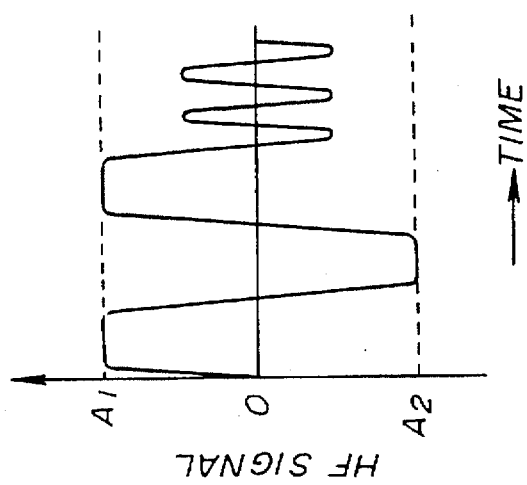
Figure 12C:
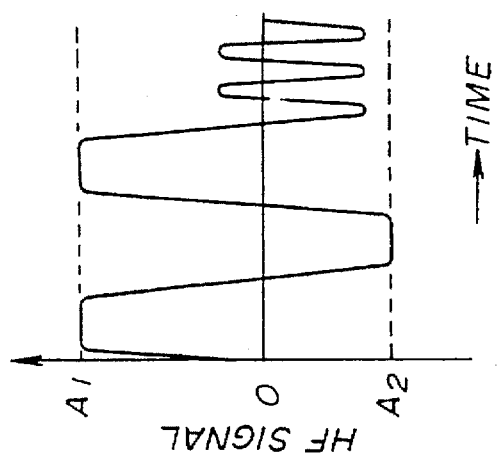

The ninth embodiment will now be described with reference to FIGS. 12A, 12B and 12C. In the ninth embodiment, how to determine the optimum write LD power in the sequence shown in FIG. 7 is defined. In the sequence shown in FIG. 7, the erase LD power is fixed while the write LD power is varied as mentioned above in the description of the third embodiment. FIGS. 12A, 12B and 12C show waveforms of signals obtained as a result of passing signals reproduced in S61 of FIG. 7 in three stages, respectively, through an AC coupler such as the AC coupler shown in FIG. 11 and described above.

The waveform shown in FIG. 12A is obtained as a result of reproducing data written using a relatively large write LD power. The waveform shown in FIG. 12B is obtained as a result of reproducing data written using the optimum write LD power. The waveform shown in FIG. 12A is obtained as a result of reproducing data written using a relatively small write LD power. Thus, if data is written in the phase-change optical disc in a condition in which the erase LD power is fixed and the write LD power is varied and then the thus-written data is reproduced, an asymmetry of the resulting reproduced signal is varied accordingly.

In fact, as shown in FIG. 12A, when the write LD power is relatively large, relatively short one of a resulting record mark tends to be elongated. As a result, a reproduction signal level therefrom is relatively high in general, and thus an average thereof is relatively high. In contrast to this, as shown in FIG. 12C, when the write LD power is relatively small, a relatively short one of a resulting record mark tends to be shortened. As a result, a reproduction signal level therefrom is relatively low in general, and thus an average thereof is relatively low.

The asymmetry $\beta$ is obtained by the following equation:

$$\beta = (A_1 + A_2)/(A_1 - A_2);$$

where $A_1$ (>0) is a signal value of the maximum magnitude of the signal as shown in FIGS. 12A, 12B and 12C while $A_2$ (<0) is a signal value of the minimum magnitude of the signal as shown in the figures. It can be said in general that the asymmetry $\beta$ represents difference between an average level of a signal reproduced from relatively long record marks and an average level of a signal reproduced from relatively short record marks.

In the ninth embodiment, each of the reproduced signals obtained in S61 is passed through the AC coupler. Then, according to the above-mentioned equation, the asymmetry $\beta$ is obtained for each of the reproduced signals. Then, the reproduced signal which results in the minimum asymmetry β (preferably ≈0) is determined to be the best and the write LD power of the corresponding stage is determined as being the optimum one. Thus, it is possible to obtain the optimum write LD power such as to form precise record marks.

Figure 13:
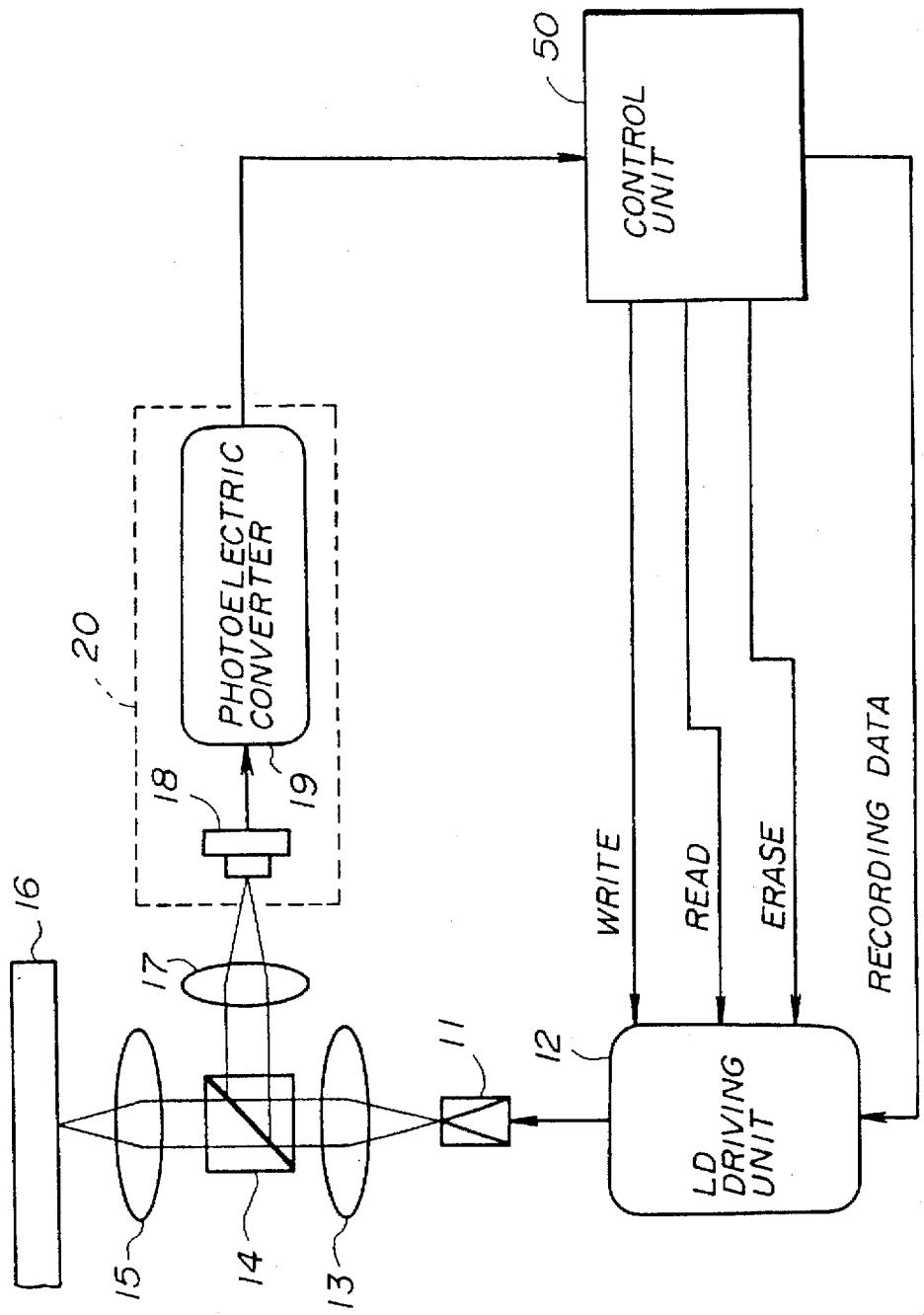
FIG. 13 shows a block diagram of a phase-change optical disc recording apparatus in a tenth embodiment of the present invention.

FIG. 13 shows a block diagram of a phase-change optical disc drive apparatus as an example of an information recording/reproducing apparatus controlling more than three values of a semiconductor light-emitting device output in a tenth embodiment of the present invention. The phase-change optical disc drive apparatus uses at least three values of read, write and erase LD powers of the semiconductor light-emitting device output to perform optical information recording and reproducing on recording media of phase-change optical discs.

A semiconductor light-emitting device, such as an LD 11 is driven by an LD driving unit 12 and thus emits light. The thus-emitted light becomes parallel light beams through a coupling lens 13, passes through a beam splitter 14, converges through an objective lens 15, and is incident on a recording medium 16 of a phase-change optical disc 16. The disc 16 is rotated by a spindle motor not shown in the figure during information recording and reproducing operations performed on the disc 16.

The light is reflected by the disc 16 and is supplied to the beam splitter 14 which is used to bend the reflected light toward a convergence lens 17. The convergence lens 17 converges the thus-supplied light to a photodiode (referred to as a PD, hereinafter) 18. The light thus-converged onto the PD 18 is converted into an electric signal through a light detector 20 including the PD 18 and a photoelectric converter 19.

The thus-obtained electric signal is supplied to a control unit 50 as the reproduced signal. The control unit 50 supplies signals to the driving unit 12 which thus drives the LD 12 and thus the LD 11 emits the light with the write, read and erase LD powers Pw, Pr and Pe. Thus, information recording and reproducing on the phase-change optical disc 16 are performed.

The control unit 50 may be such that the phase-change optical disc drive apparatus shown in FIG. 13 performs at least one of the above-described phase-change optical disc recording methods in the first through ninth embodiments of the present invention.

The phase-change optical disc drive apparatus for performing at least one of these phase-change optical disc recording methods is not limited to that described above. Any other well-known phase-change optical disc drive apparatus may be used for the same purpose after modifying or adding a control unit automatically controlling the apparatus according to a relevant one of these phase-change optical disc recording methods, according to appropriate software programs. The software programs are those which may be produced using a well-known programming technique.

Further, the above-described first through tenth embodiments of the present invention may be applied to a phase-change optical disc in which information is recorded using the above-mentioned PWM method. Further, the above-described first through tenth embodiments of the present invention may be applied to a phase-change optical disc in which information is recorded according to an well-known CD (Compact Disc) format. Further, the above-described first through tenth embodiments of the present invention may be applied to a known DVD (Digital Video Disc).

Further, each phase-change optical disc drive apparatus which will be now described is also used to performing at least one of these phase-change optical disc recording methods.

Figure 14:
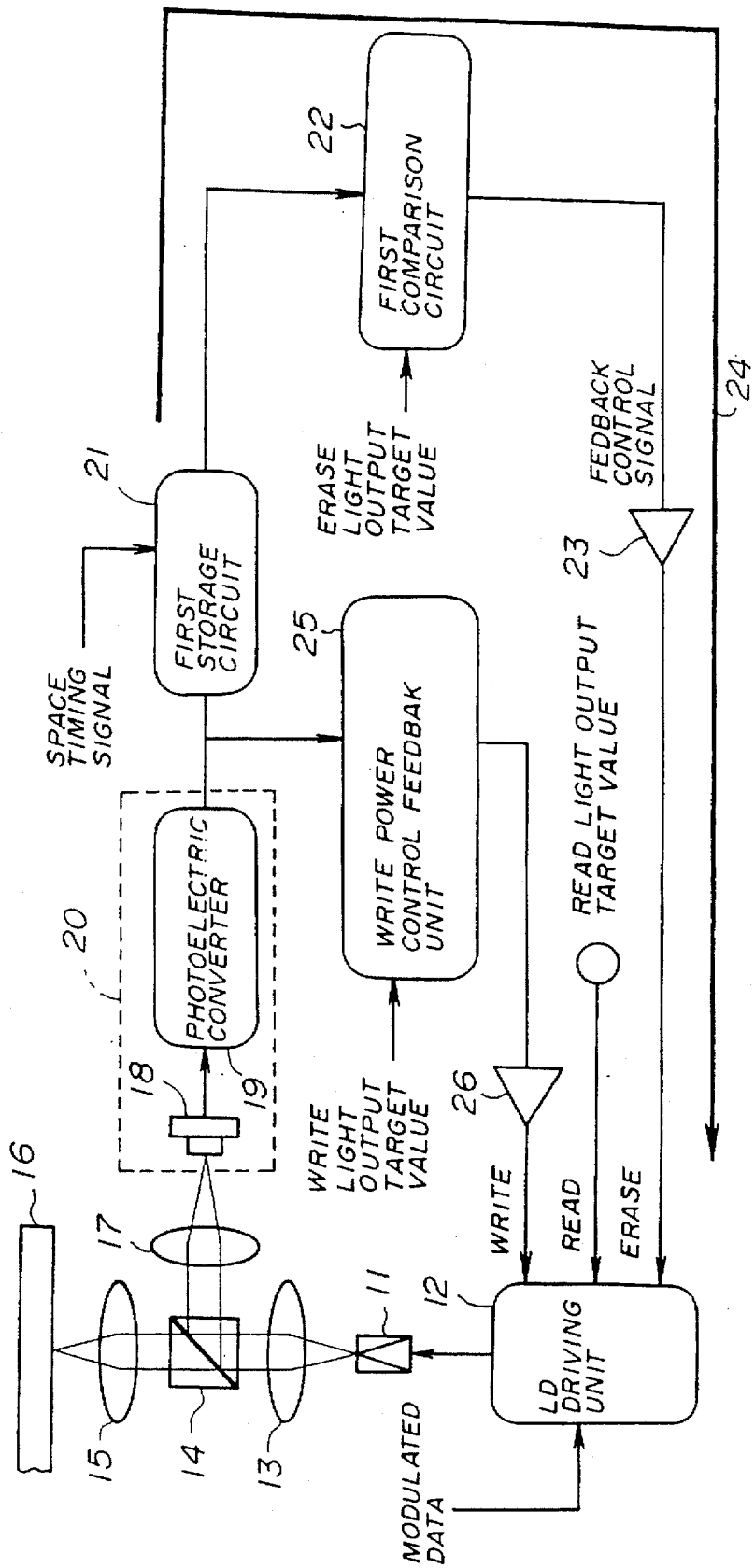
FIG. 14 shows a block diagram of a phase-change optical disc recording apparatus in an eleventh embodiment of the present invention.

FIG. 14 shows a block diagram of a phase-change optical disc drive apparatus as an example of an information recording/reproducing apparatus controlling more than three values of a semiconductor light-emitting device output in an eleventh embodiment of the present invention. The phase-change optical disc drive apparatus uses at least three values of read, write and erase LD powers of the semiconductor light-emitting device output to perform optical information recording in and reproducing from recording media of phase-change optical discs.

A semiconductor light-emitting device, such as an LD 11 is driven by an LD driving unit 12 and thus emits light. The thus-emitted light becomes parallel light beams through a coupling lens 13, passes through a beam splitter 14, converged through an objective lens 15, and is incident on a recording medium 16 of a phase-change optical disc 16. Thus, information is recorded in the phase-change optical disc 16 and light reflected from the disc 16 is used to reproduce information from the disc 16. The disc 16 is rotated by a spindle motor not shown in the figure during the information recording and reproducing operations.

A part of the light emitted from the LD 11 is reflected by the beam splitter 14 and separated from the light. A convergence lens 17 converges the thus-separated partial light to a PD 18. The light thus-converged onto the PD 18 is converted into an electric signal through a light detector 20 including the PD 18 and photoelectric converter 19.

The LD driving unit 12 drives, according to modulated data supplied thereto, the LD 11 and thus the LD 11 emits light and controls the emission light powers to be target values of the write-power and erase-power emission light powers when writing data in the disc 16. The LD driving unit 12 drives the LD 11 and thus the LD 11 emits light with a target value of the read-power emission light power when reproducing data from the disc 16.

In the eleven embodiment, means for controlling the erase power Pe, individually from control of the write power Pw and control of the read power Pr, is provided. The light is emitted from the LD 11 with the erase power Pe when the LD 11 is used to write record data of '0', that is, form no record mark (space). An output signal of the light detector 20 is input to a first storage circuit 21.

Figure 15:
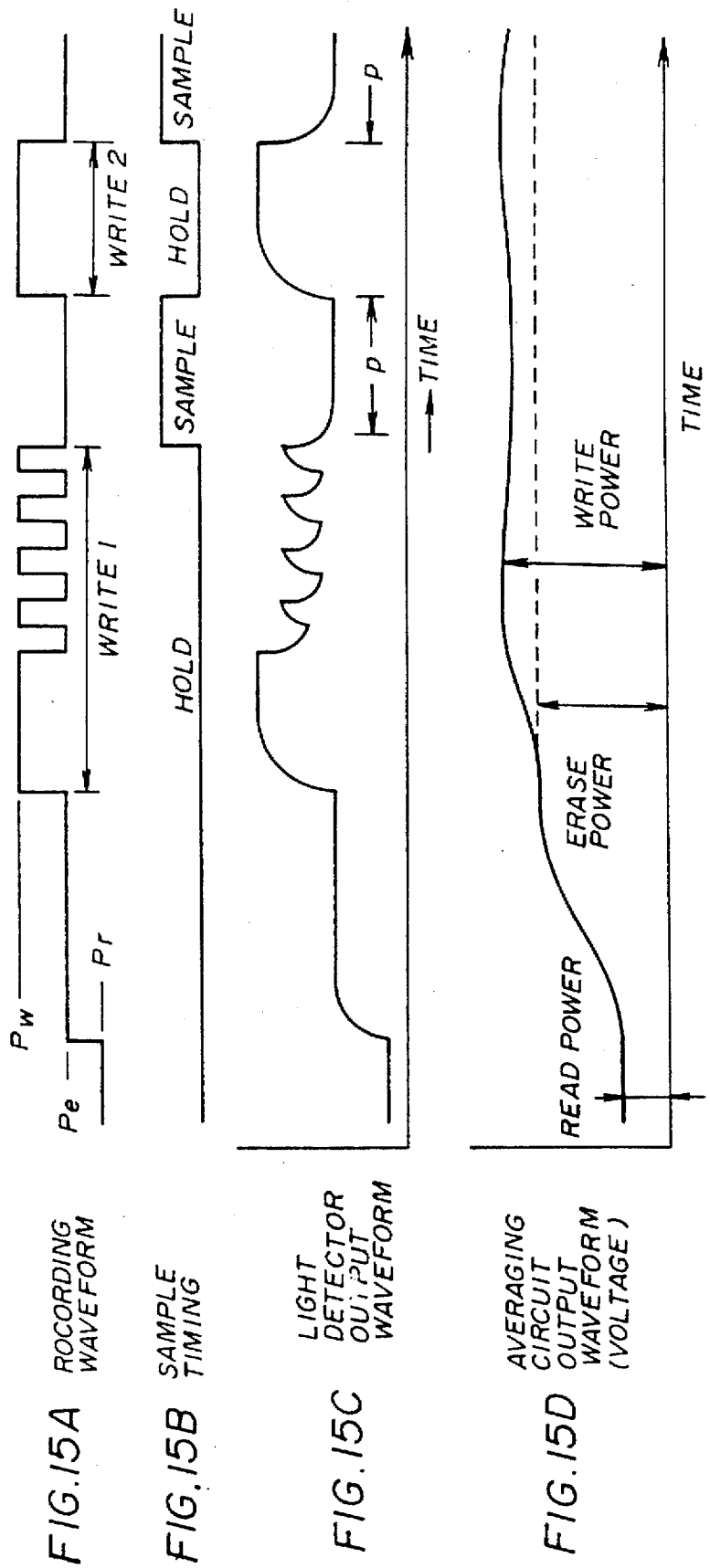
FIGS. 15A, 15B, 15C, and 15D show waveforms of signals supplied in the apparatus shown in FIG. 14.

FIG. 15A shows a waveform of the light power with which the LD 11 emits the light to the disc 16. The first storage circuit 21 stores the output signal of the light detector 20 when a space timing signal (sampling timing signal), shown in FIG. 15B and supplied to the first storage circuit 21 as shown in FIG. 14, is active, that is, at a high level, that is, during time periods 'P' shown in FIG. 15C. The high level of the space timing signal indicates that the record data of '0' is recorded.

With reference to FIGS. 15A and 15C, a waveform output from the light detector 20 shown in FIG. 15C is distorted from the waveform of the light power shown in FIG. 15A. This distortion occurs due to time characteristics of the light detector 20. Generally speaking, a light detector cannot adequately respond to a very-high-frequency light signal.

A first comparison circuit 22 compares an output signal of the first storage circuit 21 with a preset erase output light target value (erase-power emission light power target value) which is also supplied to the first comparison circuit 22. A comparison result of the first comparison circuit 22 is appropriately amplified by an amplifier 23 and then input to the LD driving unit 12 as an erase power feedback control signal.

The first storage circuit 21, first comparison circuit 22 and amplifier 23 form a first feedback unit 24. FIG. 15D shows an output signal of a averaging circuit which will be described later. The first storage circuit 21 and the above-described space timing signal are formed of, for example, a well-known sample-and-hold circuit and a sample signal therefor (for sampling data during the time period 'P' shown in FIG. 15C).

In this eleventh embodiment, the write power Pw is controlled separately from the control of the erase power Pe. A second feedback unit 25 for this purpose carries out an operation using the output signal of the light detector 20 and a write output light target value (write-power emission light power target value) supplied to the second feedback unit 25. An output signal of the second feedback unit 25 is appropriately amplified by an amplifier 26 and then input to the LD driving unit 12 as a write power feedback control signal.

Figure 16:
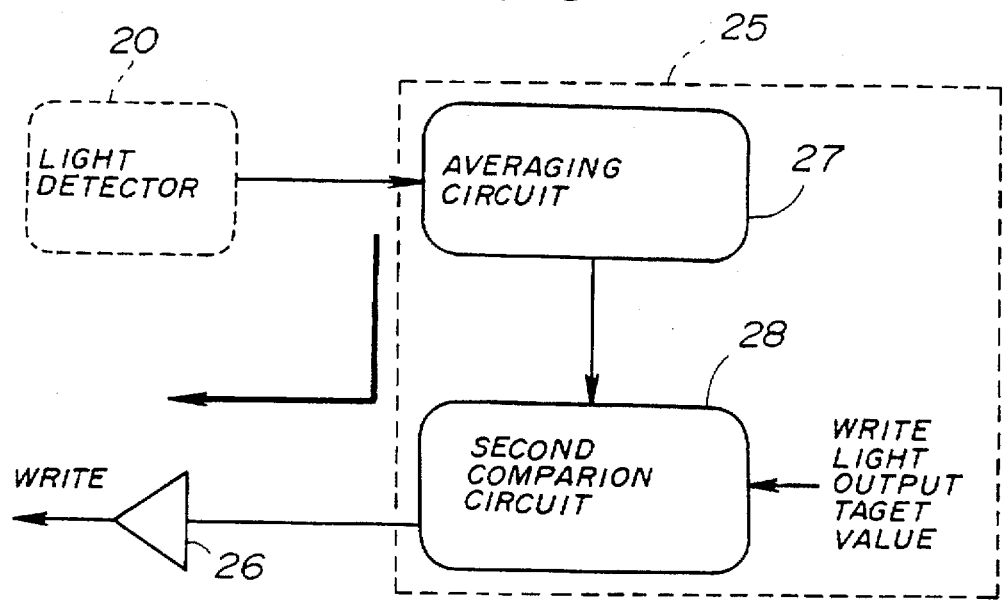
FIG. 16 shows a block diagram of a part of the apparatus shown in FIG. 14.

FIG. 16 shows a block diagram of the second feedback unit 25. The output signal of the light detector 20 is input to the averaging circuit 27 as a write power detection signal and averaged there. An output signal of the averaging circuit 27 is compared by a second comparison circuit 28 with the write output light target value. A comparison result of the second comparison circuit 28 is appropriately amplified by the amplifier 26 and then input to the LD driving unit 12 as the write power feedback control signal.

The LD driving unit 12, when writing information in the disc 16, drives the LD 11 with the write power feedback control signal supplied by the second feedback unit 25 and the erase power control signal supplied by the first feedback unit 24 appropriately. Thus, the LD 11 emits light with the write power Pw and a power smaller than the write power, in this case, equal to the erase power Pe, alternately as shown in FIG. 15A during a time period indicated by 'WRITE 1' in the figure when the record mark to be recorded to the disc 16 is relatively long (Also see FIG. 19B). When the relevant record mark is relatively short during a time period indicated by 'WRITE 2' in the figure, the LD 11 emits light only with the write power Pw.

Such a method is the above-described multi-pulse recording method. In this method, by using the waveform divided into a sequence of discrete pulses (by changing light power alternately between the write power Pw and the power smaller than the write power, in this case, equal to the erase power Pe, as shown in FIG. 15A by 'WRITE 1'), it is possible to effectively disperse the heat stored at the position in the disc 16 due to the light emission. As a result, it is possible to form an appropriate shape of the record mark (pit) on the disc 16.

The averaging circuit 27 can be provided using an integrating circuit. As shown in FIG. 15D, a difference between a level of the averaging circuit output signal corresponding to the erase power Pe (indicated by 'ERASE POWER' in FIG. 15D) and a level thereof corresponding to the write power Pw (indicated by 'WRITE POWER' in FIG. 15D) is smaller than the level corresponding to the erase power Pe. Therefore, a possible error included in the erase power Pe may greatly influence the output signal of the averaging circuit 27. As a result, in order to accurately control the write power Pw, it is necessary to accurately control the erase power Pe.

In this eleventh embodiment, the output signal of the light detector 20 at the time when the erase power Pw is used in the light emission (that is, when the record data of '0' is written) is appropriately sampled by the first storage circuit 21 using the above-mentioned space timing signal supplied thereto. The thus-sampled signal corresponding to the erase power Pe is used to control the erase power. As a result, it is possible to control the erase power separately from the read power Pr and write power Pw. Further, the write power Pw is controlled using the averaged output signal of the light detector, in which averaged signal the level corresponding to the erase power Pe thus accurately controllable is near to the level corresponding to the write power Pw as shown in FIG. 15D. As a result, it is also possible to accurately control the light power with which the LD 11 emits light in the multi-pulse recording method.

Further, in the multi-pulse recording method, a time during which the LD 11 emits light with a fixed light power is very short. Therefore, if a light power emitted by the LD 11 at each time is accurately measured, the light detector 20 should be one having a high performance and thus high costs. However, in this eleventh embodiment, the erase-power emission light power is measured by sampling the output signal of the light detector 20 and the write-power emission light power is measured by averaging the output signal of the light detector 20. When the record data of '0' is written, during a relatively long time period 'P', the light emission power is fixed to the erase power Pe as shown in FIG. 15A. As shown in FIG. 15C, during the time period 'P', the level of the output signal of the light detector 20 is stabilized. Therefore, the erase-power emission light power is considerably accurately measured by the sampling manner even if the light detector 20 has a relatively low performance (a low frequency range) and thus low costs.

Figure 17:
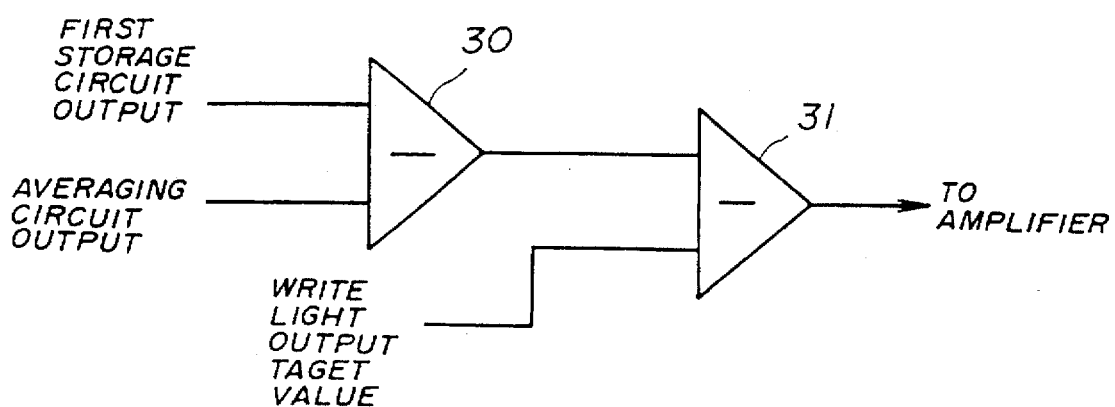
FIG. 17 shows a block diagram of a part of a phase-change optical disc apparatus in a twelfth embodiment of the present invention.

FIG. 17 shows a part of a twelfth embodiment of the present invention. In the twelfth embodiment, the second comparison circuit 28 shown in FIG. 16 is formed of a circuit shown in FIG. 17 using two comparison circuits 30 and 31. The comparison circuit 30 compares the output signal of the averaging circuit 27 with the output signal of the first storage circuit 21. The comparison circuit 31 compares the output signal of the comparison circuit 30 with a differential write output light target value, and supplies a comparison result to the amplifier 26 which appropriately amplifies the comparison result and supplies it to the LD driving unit 12 as the write power feedback control signal.

In this twelfth embodiment, the differential write output light target value supplied to the comparison circuit 31 does not correspond to the level corresponding to the write power Pw shown in FIG. 15D. This differential write output light target value corresponds to a difference between the level corresponding to the write power Pw and the level corresponding to the erase power Pe shown in FIG. 15D.

In the above-described eleventh embodiment, if the erase output light target value is altered, it is necessary to alter the write output light target value so as to keep the difference between the write power Pw and erase power Pe to be a fixed value. In contrast to this, in the twelfth embodiment, the write power Pw is controlled using the differential write output light target value which corresponds to the difference between the write power Pw and erase power Pe. Therefore, if the erase output light target value is altered, it is not necessary to alter the differential write output light target value so as to keep the difference between the write power Pw and erase power Pe to a fixed value.

Further, in the twelfth embodiment, similarly to the eleventh embodiment, the erase power Pe is controlled independently. Further, by the same reasons as for the eleventh embodiment, the erase-power emission light power is considerably accurately measured by the sampling manner even if the light detector 20 has a relatively low performance (a low frequency range) and thus low costs. Further, the write power Pw is controlled using the averaged output signal of the light detector, in which averaged signal the level corresponding to the erase power Pe thus accurately controllable is near to the level corresponding to the write power Pw as shown in FIG. 15D. As a result, it is also possible to accurately control the light power with which the LD 11 emits light in the multi-pulse recording method.

Figure 18:
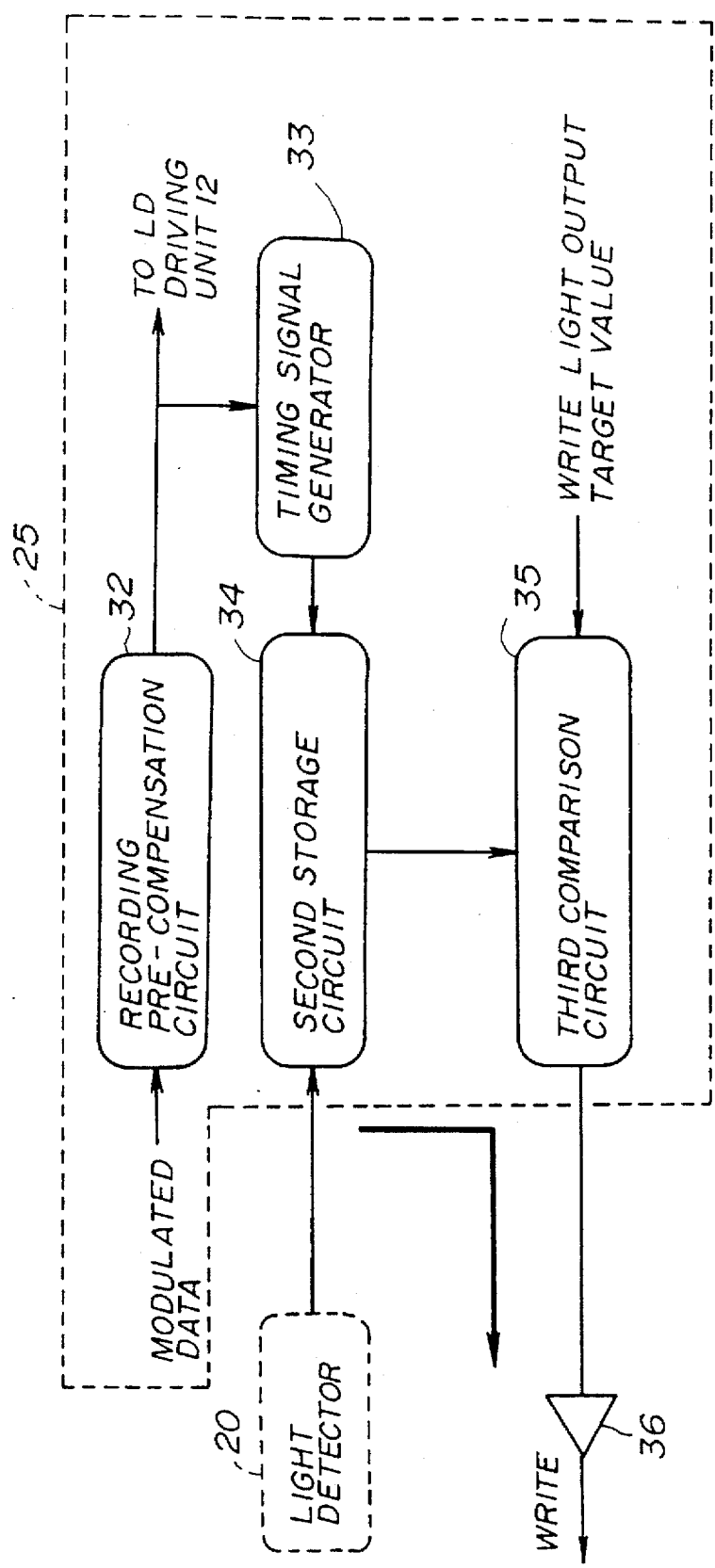
FIG. 18 shows a block diagram of a part of a phase-change optical disc apparatus in a thirteenth embodiment of the present invention.
Figure 19:
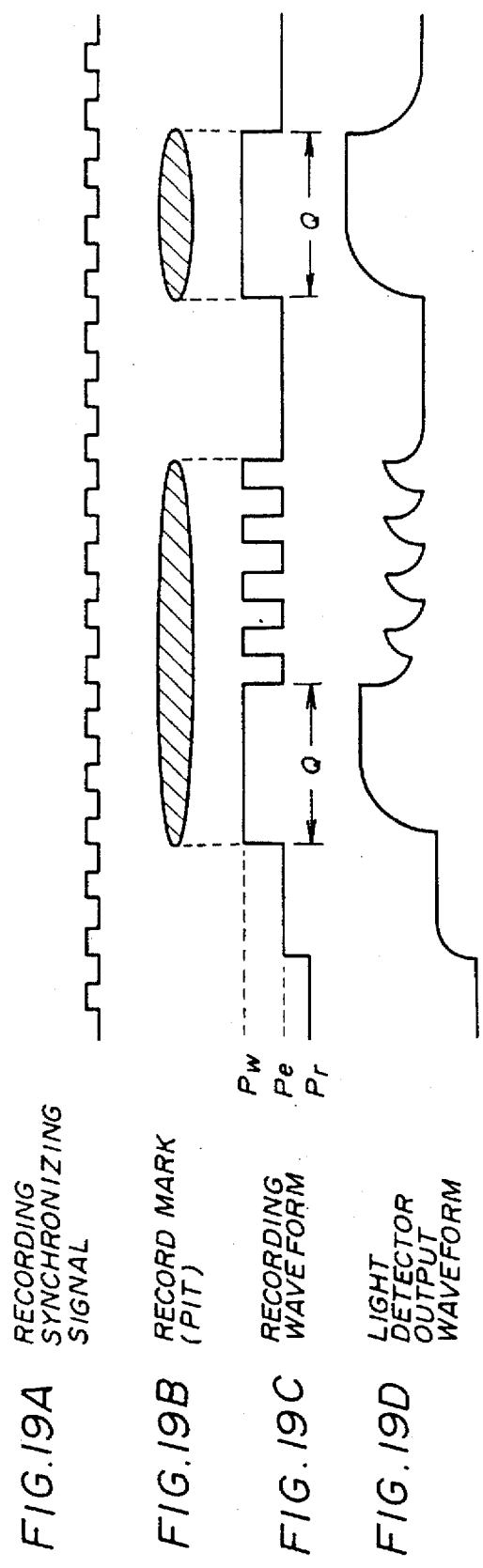
FIGS. 19A, 19B, 19C, and 19D show waveforms of signals supplied in the apparatus shown in FIG. 18.

FIG. 18 shows a part of a thirteenth embodiment. In the thirteenth embodiment, the second feedback unit 25 in the eleventh embodiment shown in FIG. 14 is formed of a circuit shown in FIG. 18. In the thirteenth embodiment, data is written in the disc 16 using the above-mentioned PWM method and further using a head weighting multi-pulse recording method. In the head weighting multi-pulse recording method, as shown in FIGS. 19B and 19C, when one record mark (pit) is formed on the disc 16 as shown in FIG. 19B by light irradiation, a series of light-emitting pulses with different light emission powers are used. In the series of light-emitting pulses, particularly, the head pulse has a relatively long time period indicated by 'Q' in FIG. 19C. This is the reason for calling this method 'head weighting multi-pulse recording method'.

In the thirteenth embodiment, according to the multi-pulse recording method, a recording pre-compensation circuit 32 generates a head weighting signal using modulated data supplied thereto. Thus, this modulation data is converted into a multi-pulse signal and thus a pulse for forming one record mark is divided into the series of light emission pulses. A timing signal generator 33, using the multi-pulse head weighting signal output from the recording pre-compensation circuit 32, outputs a timing signal which indicates the time period 'Q' of the head pulse which was weighted (elongated in its span) as mentioned above. The multi-pulse head weighting signal output by the recording pre-compensation circuit 32 is shown in FIG. 19C, and is supplied to the LD driving unit 12 as modulated data.

A second storage circuit 34 shown in FIG. 18 receives the timing signal from the timing signal generator 33 and stores the output signal of the light detector 20 when the timing signal indicates the time period 'Q' of the head pulse. An output signal of the second storage circuit 34 is supplied to a third comparison circuit 35 which compares the thus-supplied output signal with the preset write output light target value. A comparison result of the third comparison circuit 35 is appropriately amplified by an amplifier 36 and then supplied to the LD driving unit 12 as the write-power feedback control signal.

In the thirteenth embodiment, the erase power Pe is individually, accurately controlled similarly to the eleventh embodiment. The write power Pw is controlled using the output signal of the light detector 20 in a manner in which this output signal is only used during the time period 'Q' of the head pulse having the relatively long time period. As shown in FIG. 19D, during the time period 'Q' shown in FIG. 19C in which the write power Pw is maintained, the level of the output signal of the light detector 20 is stabilized. Therefore, the write-power emission light power is considerably accurately measured even if the light detector 20 has a relatively low performance (a low frequency range) and thus low costs.

Figure 20:
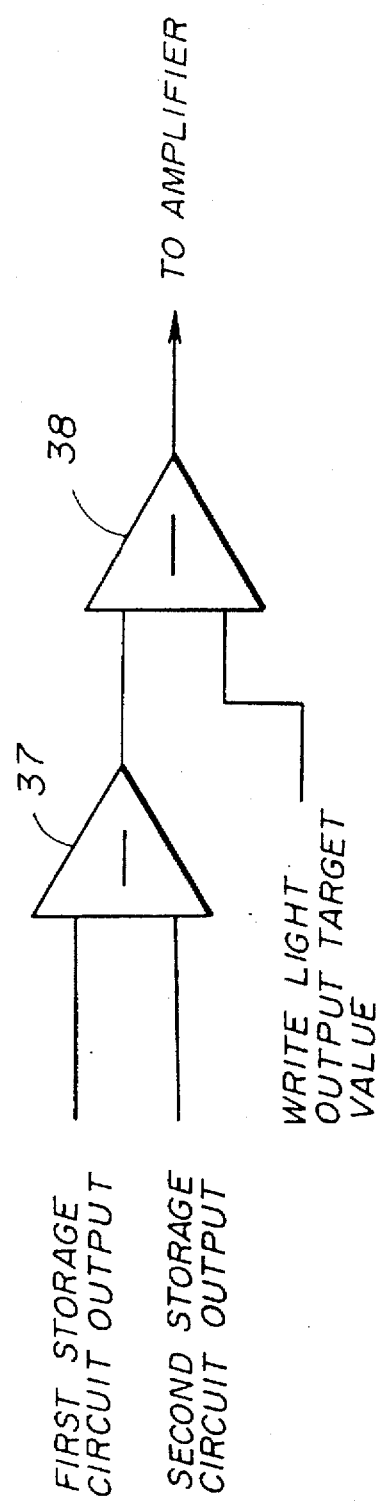
FIG. 20 shows a block diagram of a part of a phase-change optical disc apparatus in a fourteenth embodiment of the present invention.

FIG. 20 shows a part of a fourteenth embodiment of the present invention. In the fourteenth embodiment, two comparison circuits 37 and 38 shown in FIG. 20 are used instead of the third comparison circuit 35 in the thirteenth embodiment shown in FIG. 18. The comparison circuit 37, when data is written in the disc 16, obtains a difference between the output signal of the second storage circuit 34 shown in FIG. 18 and the output signal of the first storage circuit 21 shown in FIG. 14. The output signal of the second storage circuit 34 corresponds to the write power Pw sampled during the time period 'Q' shown in FIG. 19C. The output signal of the first storage circuit 21 corresponds to the erase power Pe sampled during the time period 'P' shown in FIG. 15C.

The comparison circuit 38 shown in FIG. 20 compares a difference signal supplied by the comparison circuit 37 with the differential write output light target value. A comparison result is appropriately amplified by an amplifier and then supplied to the LD driving unit 12 as the write-power feedback control signal.

In the above-described thirteenth embodiment, if the erase output light target value is altered, it is necessary to alter the write output light target value so as to keep the difference between the write power Pw and erase power Pe to be a fixed value. In contrast to this, in the fourteenth embodiment, the write power Pw is controlled using the differential write output light target value which corresponds to the difference between the write power Pw and erase power Pe. Therefore, if the erase output light target value is altered, it is not necessary to alter the differential write output light target value so as to keep the difference between the write power Pw and erase power Pe to a fixed value.

Further, in the fourteenth embodiment, similarly to the thirteenth embodiment, the erase power Pe is controlled independently. Further, by the same reasons as for the third embodiment, the erase-power emission light power is considerably accurately measured and thus it is possible to accurately control the erase power Pe, even if the light detector 20 has a relatively low performance (a low frequency range) and thus low costs. Further, the write power Pw is controlled using the output signal of the light detector sampled during the time period of the head pulse of the head weighting signal. The write power Pw is maintained for a relatively long time period at the head pulse and thus can be measured accurately. Thus, it is possible to accurately control the write power Pw, even if the light detector 20 has a relatively low performance (a low frequency range) and thus low costs.

FIG. 21 shows a part of a fifteenth embodiment of the present invention. In the fifteenth embodiment, data is written in the disc 16 in a multi-power recording method as shown in FIGS. 22A, 22B and 22C. In this method, when one record mark is formed on the disc 16, in order to realize an ideal shape of the record mark, heat storage in the disc 16 is appropriately controlled by varying the light power between three levels, Pw1, Pw2 and Pw3 shown in FIG. 22C. As a result, data is written in the disc 16 using a total of four light-emission power levels: the erase power Pe and the three write powers Pw1, Pw2 and Pw3.

In this recording method, because each pulse has a relatively short time period, it is difficult to individually control a light-emission power level of each pulse. Therefore, in the fifteenth embodiment, the LD driving unit 12 in each one of the above-described eleventh, twelfth, thirteenth and fourteenth embodiments includes a circuit shown in FIG. 21.

In this LD driving unit 12, three constant electric-current power-source circuits 39, 40 and 41 are controlled by three write-power control circuits 43, 44 and 45 which control the power-source circuits 39, 40 and 41 according to the modulated data supplied by the recording pre-compensation circuit 42 and the feedback control signal supplied by at least one of the above-described first and second feedback units 24 and 25. The LD 11 is driven by the power source circuits 39, 40 and 41 and thus emits light with the write light powers Pw1, Pw2 and Pw3.

The recording pre-compensation circuit 42 receives modulated data and divides a pulse of the modulated data for forming one record mark into a series of pulses in synchronization with reference clock pulses shown in FIG. 22A, as shown in FIG. 22C. The write-power control circuits 43, 44 and 45 are driven by the above-mentioned series of pulses of the modulated data, and control the constant-current power-source circuits 39, 40 and 41 according to the feedback control signal supplied by at least one of the first and second feedback units 24 and 25 via resistors 46 and 47 as shown in FIG. 21.

In this way, ratios between the light powers Pe, Pw1, Pw2 and Pw3 are previously fixed by resistances of the resistors 46 and 47, and by amplifying ratios of amplifiers, not shown in FIG. 21, for amplifying the control signals supplied to the constant-current power-source circuits 39, 40 and 41. Therefore, the write-power control circuits 43, 44 and 45 determine one or two of the four powers Pe, Pw1, Pw2 and Pw3 according to the feedback control signal supplied by at least one of the first and second feedback units 24 and 25. Then, the write-power control circuits 43, 44 and 45 determine the other powers using the thus-determined one or two and the previously fixed ratios therebetween.

Thus, in the fifteenth embodiment, only one or two of the four powers Pe, Pw1, Pw2 and Pw3, are determined according to the feedback control signal and the other ones are determined using the thus-determined one or two and the previously fixed ratios. Therefore, it is possible to perform an accurate LD output control even if the multi-power recording pre-compensation or multi-pulse production is performed with a high-speed emission light power variation which cannot be appropriately measured by an ordinary one of the light detector 20.

A sixteenth embodiment of the present invention will now be described. This embodiment is a recording pre-compensation system (for changing one pulse for forming one record mark to a series of multiple pulses as shown in FIGS. 23A and 23B according to the multi-pulse recording system) in a recording system adaptable to a plurality of recording speeds (a line velocity of a recording head along a disc track). Recently, in a recording system for a CD-ROM, CD-R (recordable CD) or the like, there is a system which can operate in a plurality of recording speeds, not only 1.2 m/s through 1.4 m/s 'once (×1)', but also 'twice (×2)', and 'four times (×4)', in a single apparatus.

In such a recording system, ordinarily, recording pre-compensation is performed with reference to recording synchronizing signals (for example, having frequencies of 4.3218 MHz for 'once (×1)' and 8.6436 MHz for 'twice (×2)'), as shown in FIGS. 23A, 23B, 23C, 23D, 23E and 23F. Thus, the recording pre-compensation is performed similarly for the 'once (×1)' recording speed and for the 'twice (×2)' recording speed with respect to the recording synchronizing signals respectively. As a result, a recording waveform shown in FIG. 23F resulting from performing the recording pre-compensation on the modified data shown in FIG. 23E with respect to the relevant recording synchronizing signal shown in FIG. 23D is similar to but half, along the time axis, a recording waveform shown in FIG. 23C resulting from performing the recording pre-compensation on the modified data shown in FIG. 23B with respect to the relevant recording synchronizing signal shown in FIG. 23A.

The recording pre-compensation of the multi-pulse recording method is performed for forming an ideal record mark on a phase-change optical disc by appropriately controlling heat storage in the disc. Further, a composition alteration (phase change) rate of a recording layer of the disc is faster than the recording speed. Therefore, it is necessary to perform the recording pre-compensation not according to the recording speed but according to the composition alteration rate of the recording layer of the disc.

In the sixteenth embodiment, a semiconductor light-emitting device such as the LD is used for emitting light and information recording and reproducing is performed on the phase-change optical disc at a plurality of recording speeds. In the information recording, the light emitted to the disc is controlled by light power on which the recording pre-compensation is previously performed. The recording pre-compensation (dividing one pulse for forming one record mark to a series of multiple pulses) is performed with reference to the recording synchronizing signal.

In the recording pre-compensation, a reference signal is used which has a frequency obtained as a result of multiplying, by an integer, a frequency of the recording synchronizing signal which is necessary for performing data recording at a highest recording speed. This reference signal will be referred to as a 'reference clock signal', hereinafter. Specifically, a period of each clock pulse of the reference clock signal is used as a minimum division unit for dividing a pulse of the modified data to a series of multiple pulses in the recording pre-compensation for the plurality of recording speeds.

FIGS. 24A, 24B, 24C, 24D and 24E illustrate this method in the sixteenth embodiment. A recording waveform shown in FIG. 24D is obtained as a result of performing the recording pre-compensation on the modified data of the 'once (×1)' recording speed with the reference clock signal equal to the recording synchronizing signal for the 'twice (×2)' recording speed. As a result, a pulse span of the head pulse of the series of multiple pulses shown in FIG. 24D is equal to a pulse span of the head pulse of the series of multiple pulses shown in FIG. 23D which results from performing the recording pre-compensation on the modified data of the 'twice (×2)' recording speed with the reference clock signal equal to the recording synchronizing signal for the 'twice (×2)' recording speed. Similarly, a pulse span of each of pulses subsequent to the head pulse of the series of multiple pulses shown in FIG. 24D is equal to a pulse span of each of pulses subsequent to the head pulse of the series of multiple pulses shown in FIG. 23D.

Thus, in the sixteenth embodiment, the same reference clock signal is used for the plurality of recording speeds. Therefore, it is not necessary to change the reference clock signal when the recording speed is changed. Further, it is possible to perform the recording pre-compensation according to the composition alteration rate of the recording layer of the disc which is fixed when the recording speed is changed.

A seventeenth embodiment of the present invention will now be described. In the seventeenth embodiment, the frequency of the reference clock signal in the sixteenth embodiment is determined according to a necessary cooling time period or a necessary heating time period of the disc recording layer. The necessary cooling time period and necessary heating time period of the disc recording layer depend on the disc recording layer composition and are determined so as to form an ideal record mark (pit) on the disc recording layer.

The recording pre-compensation is previously performed, when the CD-R is used, for preventing a resulting record mark on the disc recording layer from swelling which otherwise would have occurred when a pulse was not divided into a series of multiple pulses for forming one record mark. Further, dividing a pulse into a series of multiple pulses may be effective to facilitate composition alteration (phase change) by rapidly cooling the recording layer of the phase-change optical disc as a result of changing the light emission power finely.

In each of an information recording and reproducing apparatus for the CD-R and that for the phase-change optical disc, in order to form an ideal record mark (pit) on the disc recording layer, the heating time period or cooling time period, that is, the above-mentioned minimum division unit of the recording pre-compensation depends not on the recording speed but on characteristics of the disc recording layer. Therefore, by determining the frequency of the reference clock signal of the recording pre-compensation according to the necessary heat time or cooling time depending on the characteristics of the disc recording layer, it is possible to form an ideal shape of a record mark (pit) when the recording speed is changed.

An eighteenth embodiment of the present invention will now be described with reference to FIG. 24E. In the eighteenth embodiment, the recording pre-compensation is performed, on the modified data of the 'once (×1)' recording speed shown in FIG. 24C, such that a recording waveform shown in FIG. 24E may be obtained. In the waveform shown in FIG. 24E, a time period 'S' of each of low-level parts between the series of multiple pulses is the same as a time period 'S' of each of low-level parts between the series of multiple pulses obtained from performing the recording pre-compensation on the modified data of the 'twice (×2)' recording speed shown in FIG. 23E. This time period 'S' is equal to a time period of each of low-level parts between pulses of the reference clock signal equal to the recording synchronizing signal for the 'twice (×2)' recording speed' shown in FIG. 24A. This time period is equal to the above-mentioned minimum division unit of the recording pre-compensation.

Thus, in the eighteenth embodiment, by fixing a time period 'S' of each of low level parts of the multiple pulses when the recording speed is changed, it is possible to obtain a necessary disc recording layer cooling effect depending approximately on a disc recording layer composition.

A nineteenth embodiment of the present invention will now be described with reference to FIGS. 25A, 25B, 25C, 25D and 25F. In the nineteenth embodiment, a time period 'Q' of the head pulse of the series of multiple pulses resulting from the recording pre-compensation in the sixteenth embodiment is fixed when the recording speed is changed. The above-mentioned head weighting recording method is used in this case, the time period 'Q' is the maximum division time period among those of the multiple pulses resulting from the recording pre-compensation. Such a method is advantageous because a heat amount necessary for appropriately altering the composition of the disc recording layer in the recording pre-compensation is approximately fixed when the recording speed is changed.

If the recording pre-compensation is performed with respect to the recording synchronizing signal having a frequency in proportion to the recording speed as shown in FIGS. 23A, 23B, 23C, 23D and 23F, a time period 'Q' of the head pulse, that is, the maximum division time period is altered when the recording speed is changed. As a result, it is not possible to supply an appropriate heat amount to the disc recording layer.

In the nineteenth embodiment, the reference clock signal is used in the recording pre-compensation for any recording speed, and the maximum division time period 'Q' is fixed when the recording speed is changed, as shown in FIGS. 25A, 25B, 25C, 25D and 25F. Therefore, it is possible to appropriately supply a necessary heat amount to facilitate recording layer composition alteration, which amount is approximately fixed when the recording speed is changed, to the disc recording layer.

In each of the sixteenth through nineteenth embodiments, the maximum division time period 'Q' is thee times (3T) a period (T) of the reference clock signal. However, in each of the sixteenth through nineteenth embodiments, it is also possible to perform the recording pre-compensation so as to supply a resulting series of multiple pulses such that a pulse having the maximum division time period is not located at the head but located at the middle or the tail of the series of the multiple pulses. Further, it is also possible to perform the recording pre-compensation so as to supply a resulting series of multiple pulses such that the maximum division time period 'Q' is not 3T but 2T. Even after such a modification is made, similar advantages can be obtained.

A twentieth embodiment of the present invention will now be described. The twentieth embodiment is a recording apparatus which has a system equal to a system of any one of the above-described tenth through fifteenth embodiments. The recording apparatus in the twentieth embodiment has a control unit such as the control unit shown in FIG. 13. The control unit includes a CPU which performs the recording pre-compensation of any one of the above-described sixteenth through nineteenth embodiments automatically according to appropriate software programs. The software programs are those which may be produced using a well-known programming technique.

Further, a modulation code will now be described, which code is used for obtaining the above-mentioned modulated data, the light emission being performed according to the modulated data and thus data being written in a recording medium such as the phase-change optical disc in each embodiment of the present invention described above. For example, the well-known EFM (Eight-to-Fourteen Modulation) code can be used as the modulation code, the EFM code being well used for writing data in CDs and so forth. Instead of this, NRZI (Non Return to Zero Inverted) code such as (1, 7) RLL, (2, 7) RLL or the like may be used for the same purpose.

Further, in almost all of the above-described embodiments, the write power Pw has a single value. However, the present invention can be applied to various cases. For example, it is possible that the write power Pw has multiple values, more than two values, as shown in FIG. 22C. Further, it is also possible to reduce the write power Pw to a level lower than the erase power Pe for the tail end portion of a record mark.

Further, the present invention is not limited to the above-described embodiments, and variations and modifications may be made without departing from the scope of the present invention.

What is claimed is:

1. A recording pre-compensating method to be used in a phase-change optical disc recording system, comprising steps of:

a) dividing one pulse for forming one record mark on a phase-change optical disc into a series of multiple pulses; and b) changing a recording speed at which said record mark is formed in said disc;

wherein said step a) uses a fixed reference clock signal for producing said series of multiple pulses when said step b) changes said recording speed, said reference clock signal having a frequency which obtained as a result of multiplying by an integer a frequency of a recording synchronizing signal, which is one necessary for a highest one of a plurality of recording speeds, said step b) selecting one from among said plurality of recording speeds.

2. The method according to claim 1, wherein said frequency of said fixed reference clock signal is determined according to at least one of a heating time and a cooling time required for forming an ideal shape of the record mark in a layer composition of said phase-change optical disc.

3. The method according to claim 1, wherein a time period of each of low-level portions of said series of multiple pulses is fixed when the recording speed is changed, said low-level portions of said series of multiple pulses effecting cooling of a layer composition of said phase-change optical disc during a record-mark forming process.

4. The method according to claim 1, wherein a time period of a longest pulse of said series of multiple pulses is fixed when the recording speed is changed.

5. The method according to claim 1, wherein a pit width modulation recording method is used for writing information in said phase-change optical disc.

6. A phase-change optical disc recording system, comprising:

recording pre-compensating means for dividing one pulse for forming one record mark on a phase-change optical disc into a series of multiple pulses; and control means for changing a recording speed at which said record mark is formed on said disc;

wherein said recording pre-compensating means uses a fixed reference clock signal for producing said series of multiple pulses when said step changes said recording speed, said reference clock signal having a frequency which is obtained as a result of multiplying by an integer a frequency of a recording synchronizing signal, which is one necessary for a highest one of a plurality of recording speeds, said control means selecting one from among said plurality of recording speeds.

* * * * *